United States Patent
Naude

(10) Patent No.: US 7,416,506 B2
(45) Date of Patent: Aug. 26, 2008

(54) ROTOR CONTROLLED TRANSMISSION

(75) Inventor: Johannes Jacobus Naude, Randburg (ZA)

(73) Assignee: Varibox (PTY) Limited, Randburg (ZA)

( * ) Notice: Subject to any disclaimer, the term of this patent is extended or adjusted under 35 U.S.C. 154(b) by 557 days.

(21) Appl. No.: 10/545,397

(22) PCT Filed: Oct. 15, 2003

(86) PCT No.: PCT/ZA03/00151

§ 371 (c)(1),
(2), (4) Date: Aug. 12, 2005

(87) PCT Pub. No.: WO2004/072511

PCT Pub. Date: Aug. 26, 2004

(65) Prior Publication Data

US 2006/0154774 A1    Jul. 13, 2006

(30) Foreign Application Priority Data

Feb. 12, 2003  (ZA) .................................. 2003/1147

(51) Int. Cl.
*F16H 29/10* (2006.01)
*F16H 37/02* (2006.01)
(52) U.S. Cl. ........................................ 475/218; 74/123
(58) Field of Classification Search .................... 74/125, 74/122, 117, 123
See application file for complete search history.

(56) References Cited

U.S. PATENT DOCUMENTS

| | | | | |
|---|---|---|---|---|
| 2,554,463 A | * | 5/1951 | Klamp | 74/124 |
| 2,826,097 A | * | 3/1958 | Panciroli | 475/16 |
| 4,487,085 A | * | 12/1984 | Collins | 74/113 |
| 4,936,155 A | * | 6/1990 | Gogins | 74/117 |
| 5,390,558 A | * | 2/1995 | Weinberg | 74/124 |
| 5,937,701 A | * | 8/1999 | Mimura | 74/117 |
| 6,068,570 A | * | 5/2000 | Han | 475/207 |

FOREIGN PATENT DOCUMENTS

DE    12 12 382    3/1966

OTHER PUBLICATIONS

Patent Abstracts of Japan vol. 0134, No. 89 (M-888), Nov. 7, 1989 —& JP 01 193435 A (Yoichi Furuta), Aug. 3, 1989 abstract.

* cited by examiner

*Primary Examiner*—Dirk Wright
(74) *Attorney, Agent, or Firm*—Young & Thompson

(57) ABSTRACT

A rotor controlled CVT including: input and output shafts (28,44), an elongated cam-shaped rotor (12) which is uniformly and linearly tapered over its length and is engaged for rotation with the input shaft, a plurality of cam follower units (54) which are located in structure about and are reciprocated by the rotor and include rollers (56) having treads which bear and rotate in circumferential paths on the rotor surface, angular velocity extraction devices (38) which are each engageable and partially rotated by a cam follower, means (14) for causing the extraction devices to collectively produce an output velocity at the output shaft, elements for causing relative movement between the rotor and cam followers to vary the ratio of rotation between the input and output shafts, and elements for keeping the roller treads in contact with the roller surface. The roller treads are in line contact with the rotor surface.

21 Claims, 12 Drawing Sheets

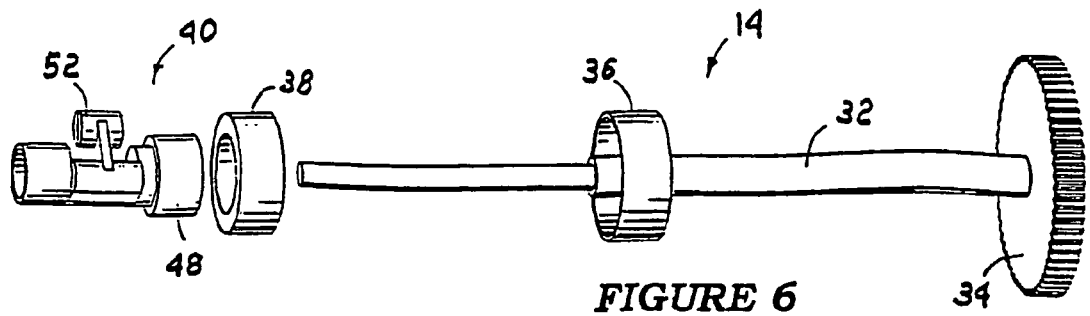
FIGURE 6
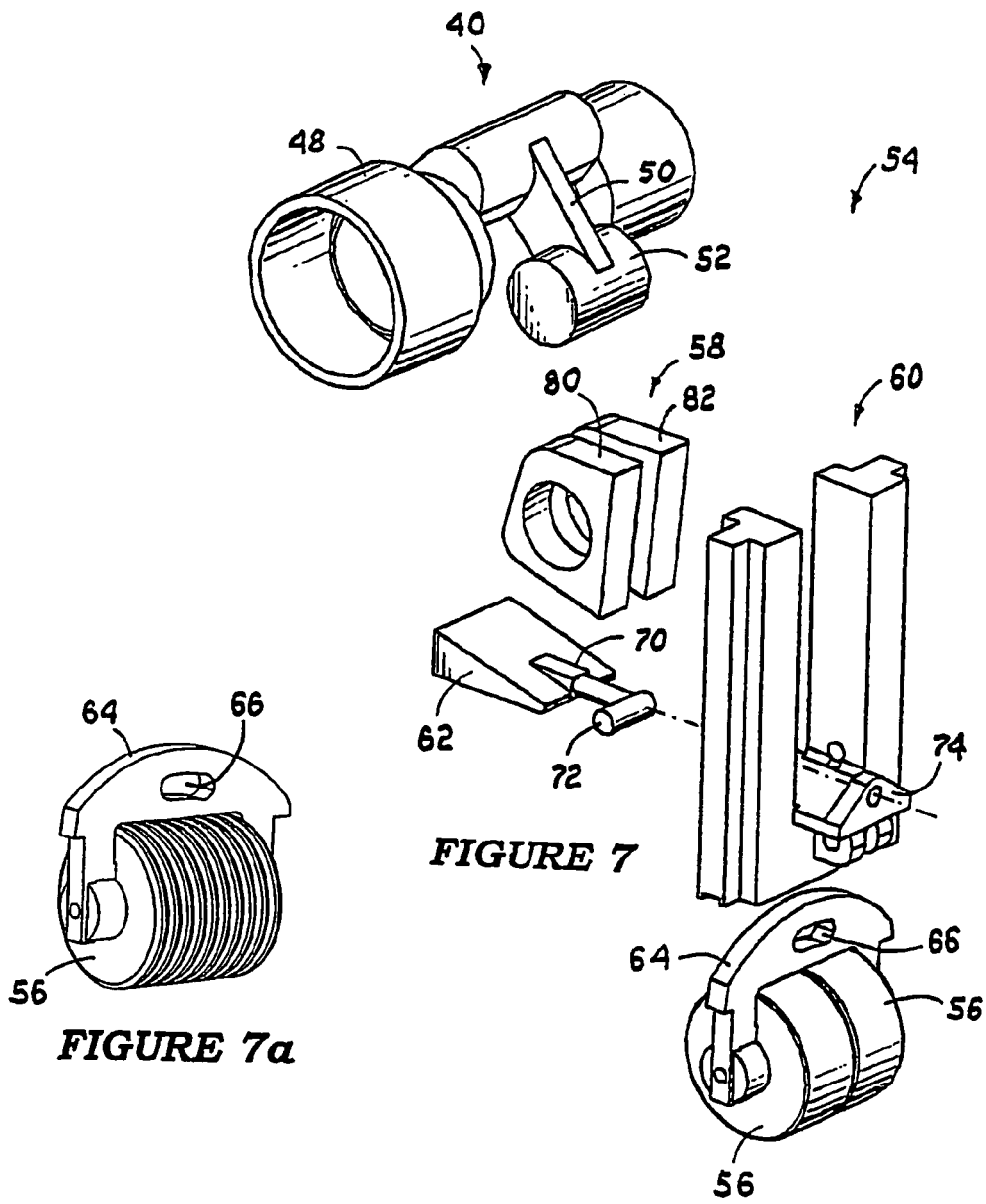
FIGURE 7
FIGURE 7a

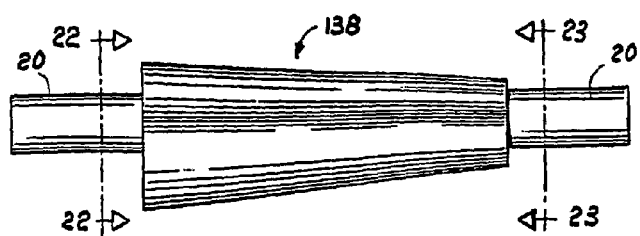
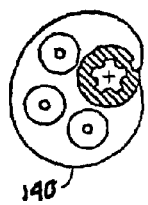
FIGURE 23     FIGURE 21     FIGURE 22
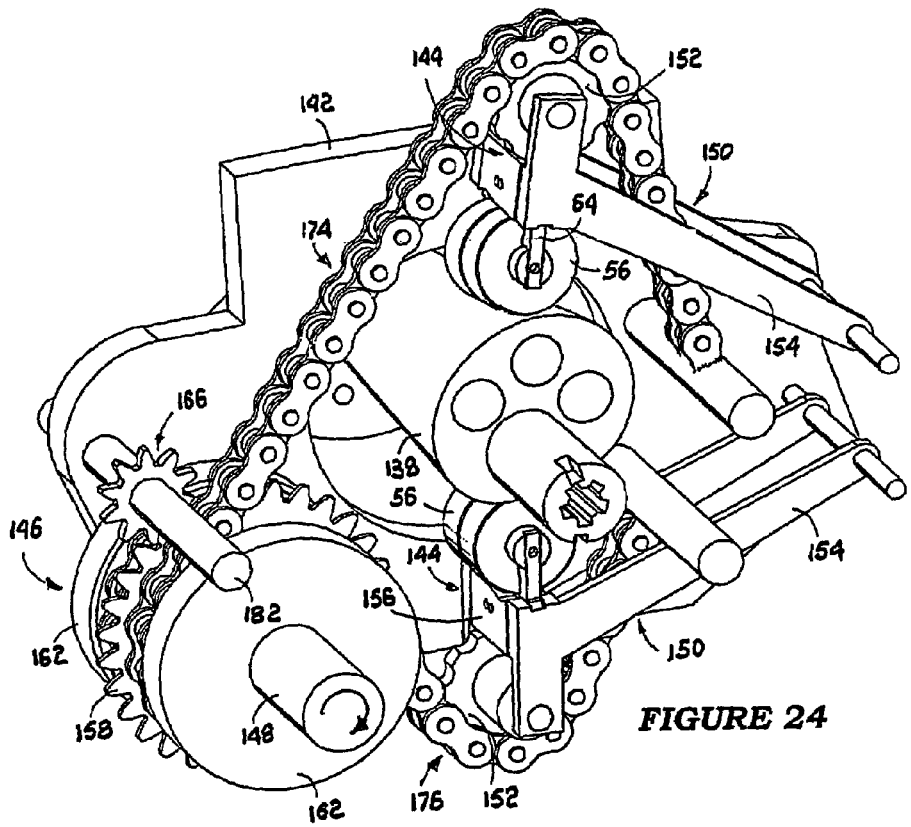
FIGURE 24
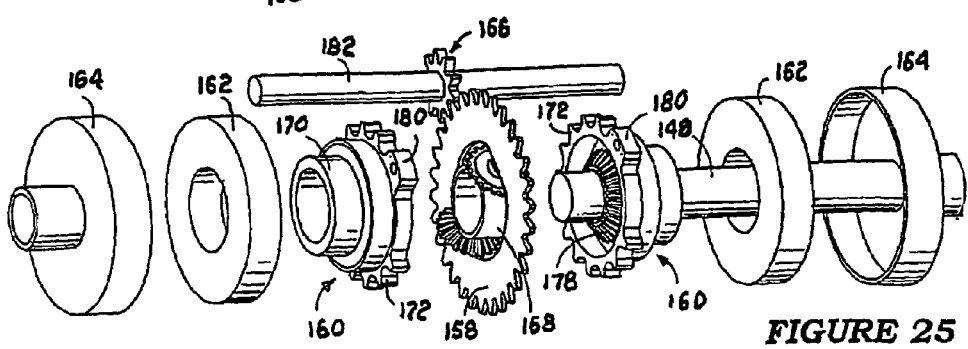
FIGURE 25

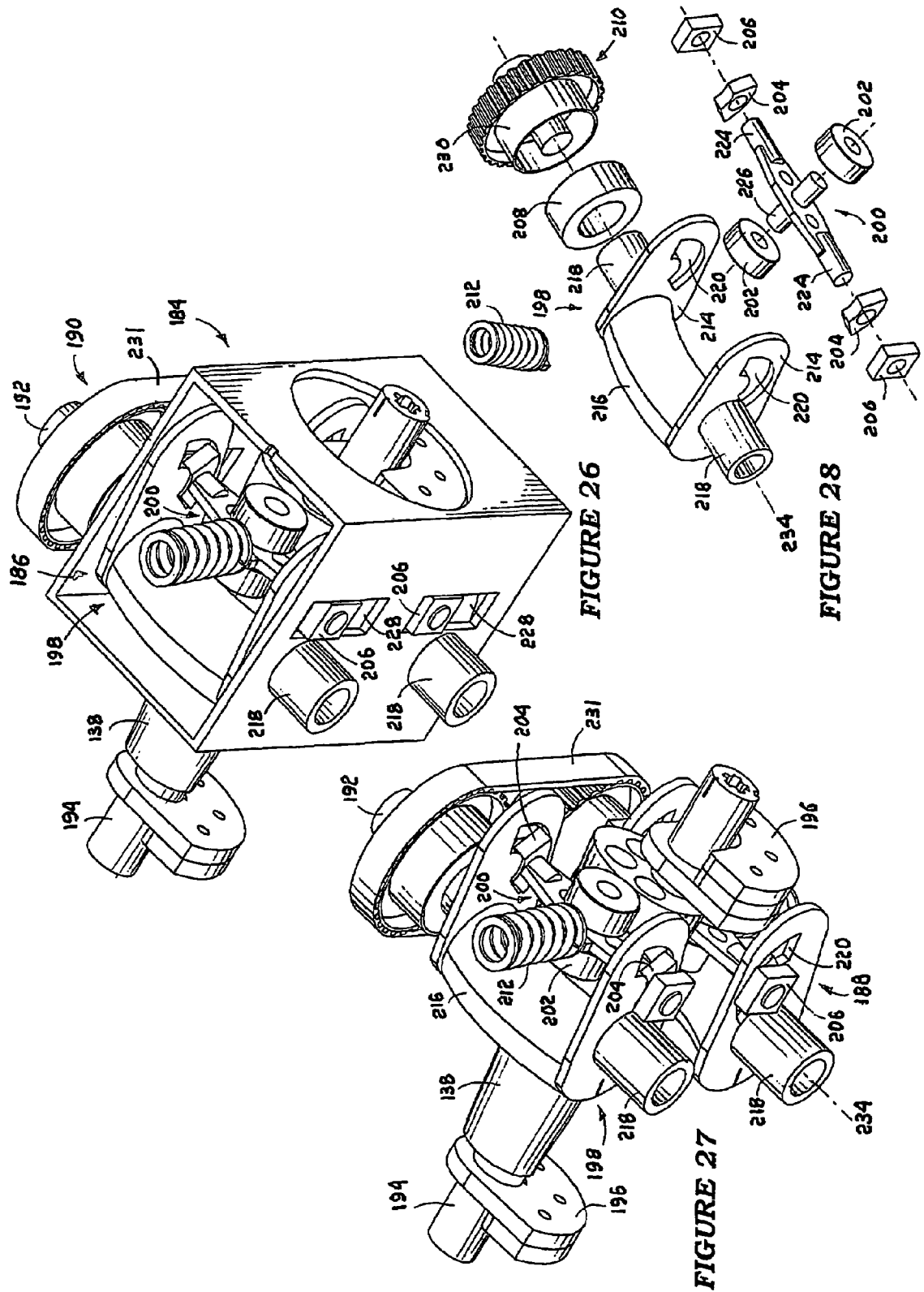

ROTOR CONTROLLED TRANSMISSION

FIELD OF THE INVENTION

This invention relates to a rotor-driven continuously variable transmission (CVT) which provides infinitely small stepless ratio changes within a specified transmission range.

BACKGROUND TO THE INVENTION

Many CVT machines have over the years been proposed and developed in attempts to produce, from a constant input velocity, an acceptably linear continuously variable output angular velocity and torque.

The basic approach to these machines has initially been to apply a single input angular velocity to a number of parallel stages of the machines which, by means of angular velocity generators such as cams, slotted plates, linkages, off-centred sun gears, non-circular gears, orbital devices, universal joints, cranks, cams and so on to produce pulsed or cycled angular velocities (angular acceleration and deceleration cycles) in each of the stages which are appropriately phased to the input angular velocity. The pulsed or cycled angular velocities from the machine stages are then used to drive selective extraction devices, such as overrunning or sprag clutches and/or differentials which extract the maximum portions of the driven cycles of the parallel stages to provide modulated angular velocity outputs. These outputs are then recombined in an output stage of the machine to provide the output angular velocity of the machine.

Examples of such machines, particularly those in connection with cam based CVT's, are disclosed in the specifications of the following U.S. Pat. No. 6,425,301, U.S. Pat. No. 4,487,085 and U.S. Pat. No. 2,159,739.

Common problems which are typically associated with the above-mentioned CVT machines of the prior art are that:

the cam followers are in a single point contact with the cam, with the point contact generating unacceptably high stresses which make their use, in high power applications such as automotive or truck applications, impractical. This problem is partially solved by the disclosure in U.S. Pat. No. 2,159,739 by having a stepped cam rotor on which, in each rotor step, line contact with cam followers is maintained, but in transition from one step to the next involves point contact of the followers with the cam and therefore only partially solves the problem and then only in respect of discreet step fixed gear ratio machines.

In U.S. Pat. No. 6,425,301 an attempt is made to solve the point contact problem by employing a perfectly circular cam, the eccentric offset of which is adjustable by a repositioning of the axis of rotation of the cam. The circular cam profile of this type of arrangement creates an output angular velocity which is rippled and results in unacceptable vibration.

The cam shaped rotor profiles used in the prior art machines are incapable of providing a specifically defined linear scaling over the length of the rotor to make line contact with the cam followers possible.

Further in the prior art machines, the cam followers are attached to an oscillating shaft creating a crank or lever action with the follower attached to the end of the lever or crank while riding on the cam. This lever or crank action does not represent a linear conversion of cam lift to a rotational motion of the oscillating shaft as the linear motion of the cam is not connected in a linear fashion to the angular motion of the lever or crank, and therefore their constant cam lift rates do not result in a constant angular velocity of the oscillating shaft. To overcome this problem in some prior art applications the cam lift has been altered to produce a non-constant lift to compensate for the non-linear crank or lever conversion.

Other prior art machines employ the use of gears as well as rack and pinion arrangements to convert linear motion to rotational motion which results in high stresses at the gear interfaces and, with the crank/lever arrangements in practice being very short, results either in very high stresses or very large gear/rack and pinion arrangements in high power applications. None of the prior art machines provide for power transmission in both directions (are not able to perform engine braking) due to the use of sprag clutches and the inability of the followers to drive the cam in the cam lift stroke.

The general state of the prior art reflects inventions for use in low power applications, such as bicycles, where constant angular output velocity is not crucial.

The prior art machines are also not suitable for high power high speed applications in which the CVT's need to provide a very high consistency in output angular velocity to avoid vibration and are not adequately compact with minimal stress concentrations to make them economically viable in the transmission industry.

SUMMARY OF THE INVENTION

A rotor controlled CVT according to the invention comprises: input and output shafts, an elongated cam-shaped rotor which is uniformly and linearly tapered over its length and is engaged for rotation with the input shaft, a plurality of cam follower units which are located in structure about and are reciprocated by the rotor and include rollers having treads which bear and rotate in circumferential paths on the rotor surface, angular velocity extraction devices which are each engageable and partially rotated by a cam follower, means for causing the extraction devices to collectively produce an output velocity at the output shaft, means for causing relative movement between the rotor and cam followers to vary the ratio of rotation between the input and output shafts, and means for keeping the roller treads in contact with the roller surface.

Each of the cam follower units preferably includes a roller which has a flat tread surface which is in line contact with the rotor and which is rotatable on the rotor surface about an axis which is held parallel to and on the tapered rotor surface by the roller contact means.

The cam follower units may include a plurality of rollers which are rotatable on the rotor surface about a common axis which is held parallel to the tapered surface of the rotor by the roller contact means with their tread contact points being in a line on the rotor which is parallel to the common axis of rotation of the rollers.

The roller contact means on each of the cam follower units may importantly include a roller carrier which carries an axle on which the or each roller is freely rotatable and which is mounted on the remainder of the cam follower unit for pivotal movement on an axis which is normal to the axis of rotation of the or each roller.

The roller contact means may include biasing means which biases the cam follower unit towards the rotor.

In a preferred form of the invention each of the cam followers, in following the cross-sectional cam profile of the rotor, is reciprocated in a radial direction relatively to the rotor axis and includes interacting components for providing a linear conversion of the radial movement of the cam followers to partial rotational movement of the components of the extraction devices which they drive.

The rotor tapers from a large cross-sectional area at one end to a smaller cross-sectional area at its other end with its uniform cross-sectional peripheral profile including sections of cam lift that respectively linearly increase at a constant rate with the corresponding change in rotor angle to coincide with the peripheral sections in which the respective extraction devices are engaged in a specific cam follower unit roller path around the rotor with the constant rate decreasing linearly from the large to the smaller cross-sectional area of the rotor.

The angular velocity extraction devices may be sprag clutches with each of the cam follower units being connected through a sprag clutch to a drive shaft which carries a fixed drive gear with the drive gears each being meshed with a common output gear.

The cam follower units may each include a linear motion transmitter which is movable in a radial direction relatively to the rotor axis of rotation and a rocker arrangement which includes a pivot head which is pivotally attached to the motion transmitter and is freely rotatable on the drive shaft so that radial movement of the motion transmitter is translated through the sprag clutch into partial angular velocity rotation of the drive shaft.

The linear conversion interacting components of each of the cam follower units may include a linear motion transmitter guide to which the roller carrier is pivotally connected and on which the motion transmitter is slidably movable, a linear motion compensating wedge which is slidably located between a surface on the transmitter guide and a surface on the motion transmitter for movement in a direction which is substantially normal to the direction of radial movement of the transmitter guide and means for moving the wedge between the two components to compensate for the non-linear conversion between the rotary motion of the rocker arrangement and the linear motion of the transmitter guide.

The common output gear may be, in one form of the invention, fixed to the CVT output shaft.

In another form of the invention the CVT output shaft could be an extension of any one of the drive shafts, through its fixed output gear, the CVT input shaft could extend through and project from the smaller cross-sectional end of the rotor, the common gear which is meshed with the drive shaft output gears may include an axial bore and the CVT preferably includes an engine braking system comprising a caged planetary gear system which is acted on by the input shaft extension, the common gear and a braking device which is located on a shaft which passes rotationally through the common gear bore to the planetary gear system and which is adapted controllably to brake the planetary system cage to cause power to be transmitted in a forward direction through the CVT from the CVT output shaft to its input shaft while creating a circulating power loop from the rotor, through the cam follower units and back to the output gears of the drive shafts.

The CVT may include a second form of engine braking system wherein the cam follower rocker arrangement includes a sleeve which carries the pivot head and which is freely rotatable on the drive shaft with the sprag clutch being connected to act between one end of the sleeve and the drive shaft, a first clutch plate on the second end of the sleeve which is releasably engageable with the first and which is fixed to a first end of a tube shaft which is freely rotatable on the drive shaft and carries on its second end a fixed bevel gear of a gear arrangement which is adapted to reverse the direction of rotation of the second clutch plate relatively to the direction of rotation of the drive shaft and control means which, during engine braking, is timed from the rotating rotor to cause the second clutch plate to engage the first only in the drop direction of the cam follower stroke to transmit power from the cVr output shaft to the rotor. For this engine braking system the rotor may be made to taper from a large cross-sectional area at one end to a smaller cross-sectional area at its other end with its uniform cross-sectional peripheral profile including sections of cam drop that linearly decreases at a constant rate with the corresponding change in rotor angle to coincide with the peripheral section in which the respective extraction devices are engaged in a specific cam follower unit roller path around the rotor with the constant rate decreasing linearly from the large to the smaller cross-sectional area of the rotor.

In a second form of the CVT of the invention may include a housing having two opposite and parallel side walls with the rotor located in and passing through the walls, two cam follower units with their rollers bearing on opposite sides of the rotor with each cam follower carrying a freely rotatable toothed roller, a planetary gear assembly which includes two bevel gears which are freely rotatable on the machine output shaft and are fixed to rollers which are each circumferentially partially tooted, pinion gears which are rotatably meshed with the bevel gears and are attached to the assembly cage, sprag clutches which are engaged with each of the bevel gear rollers and the machine output shaft, two non-elastic flexible members which are each fixed at one end to and are engaged with and pass in opposite directions over the bevel gear rollers, pass over and are engaged with the cam follower rollers with their free second ends fixed to fixed structure in the housing so that on reciprocation of the cam followers on the rotor the bevel gears will be caused to oscillate in opposite directions of rotation on the output shaft and so cause the sprag clutches sequentially to engage the output shaft during the 180° constant lift rate periods of the reciprocating cam followers on the rotor.

The rollers may be chain sprockets and the flexible members are conveniently chains.

Each of the cam follower units may be supported on a swinging arm arrangement [150] which is pivotally connected to fixed structure in the housing.

The planetary gear arrangement may be comprised of a holed sprocket with the pinion gears being rotatable on shafts engaged with the sprocket and the CVT includes a tensioning sprocket which is engaged with the cage sprocket and is biased against rotation in both directions of rotation to maintain tension on the chains as the sprag clutches are engaged with the output shaft.

In a third embodiment of the CVT of the invention the CVT may include a housing having two opposite and parallel side walls with the rotor located between the walls, at least two crank-shaped angular velocity profile generators which are equally spaced about the rotor with each of the profile generators including two spaced and parallel crank arms, a bridge member which connects the common ends of the arms, pivot trunnions which are located on and project outwardly from the arms, on a common axis, intermediate their ends and which are journaled for rotation in the opposite housing walls, an angular velocity extraction device which is located on a trunnion on each of the profile generators adjacent a common housing wall, a drive wheel which is engaged with each of the extraction devices, an endless flexible drive element which is engaged with each of the drive wheels with the CVT output shaft fixed to either of the drive wheels, with the cam follower units extending between and pivotally connected to the crank arms towards their free ends with their rollers in line contact with the rotor surface.

The cam follower units may each include a roller swivel having oppositely projecting shafts which lie on a common axis and are pivotally engaged with the crank arms, roller axles which project outwardly from the swivel on a common axis which is normal to the swivel shaft axis and on which each of the rollers is rotatably located and the roller contact biasing means is a spring which acts between the roller swivel and fixed housing structure to bias the cam follower unit towards the rotor.

The arms of the angular velocity profile generator crank arms are conveniently made from flat plate which lie in planes which are normal to the rotor axis of rotation and the linear conversion interacting components of each of the cam followers are arcuate slots in each of the crank arms, an arcuate drive segment which is rotatably located on each of the roller swivel shafts and which is slidably located in a curved arm slot, a parallel sided guide element which is rotatably located on each of the swivel shafts on the outside of the arcuate drive segment and which is slidably engaged in a parallel sided slot the direction of elongation of which is normal to the direction of the rotor axis.

BRIEF DESCRIPTION OF THE DRAWINGS

Embodiments of the invention are now described by way of non-limiting examples only with reference to the drawings in which:

FIG. 6 is an exploded view of one of the three drive shafts as used in the FIG. 1 CVT, FIG. 7 is an exploded isometric view of a cam follower unit as used in conjunction with the drive shafts of the FIG. 1 CVT, FIG. 21 is a side elevation of a second embodiment of the rotor of the inventions, FIG. 22 is an end elevation of the FIG. 21 rotor shown sectioned on the line 22-22 of FIG. 21, FIG. 23 is an end elevation of the FIG. 21 rotor shown sectioned on the line 23-23 of FIG. 21, FIG. 24 is an isometric view from above and one side of a second embodiment of the CVT of the invention, FIG. 25 is an exploded isometric view of components of the FIG. 24 CVT, FIGS. 26 and 27 are isometric views from above and one side of a third embodiment of the CVT of the invention, FIG. 28 is an exploded isometric view of an angular velocity profile generator of the CVT of FIGS. 26 and 27, and FIGS. 29, 30 and 31 are drawings used in a mathematical model of the linear drive conversion arrangement of the cam follower unit of the FIG. 28 angular velocity profile generator.

DETAILED DESCRIPTION OF THE ILLUSTRATED EMBODIMENTS

Figure 1:
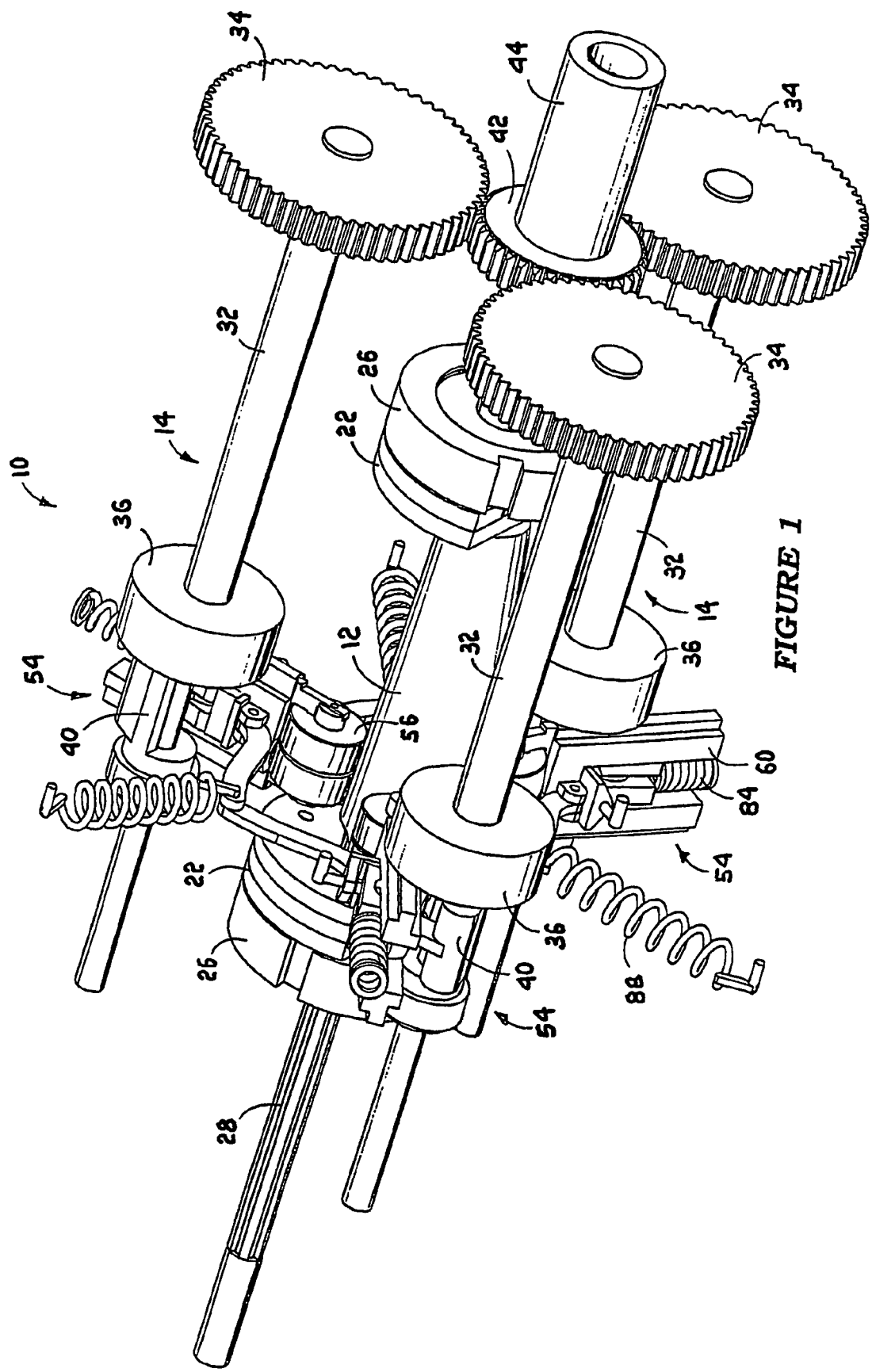
FIG. 1 is an isometric view from above and one side of a first embodiment of the CVT of the invention.

A continuously variable transmission machine 10 of FIGS. 1 to 9 is shown in FIG. 1 to include a rotor 12 and, in this embodiment of the invention, three drive shaft arrangements 14 which are spaced from each other at 120° intervals about the rotor 12.

Figure 3:
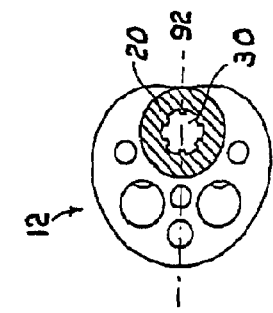
FIG. 3 is an end elevation of the FIG. 2 rotor shown sectioned on the line 3-3 in FIG. 2.
Figure 2:
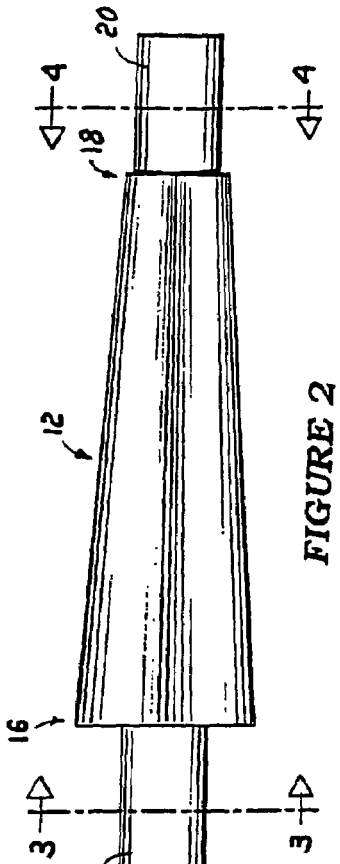
FIG. 2 is a side elevation of the rotor used in the FIG. 1 CVT.
Figure 4:
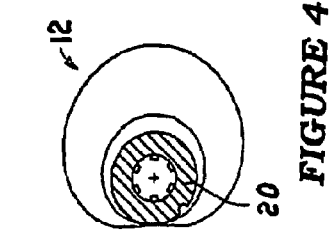
FIG. 4 is an end elevation of the FIG. 2 rotor shown sectioned on the line 4-4 in FIG. 2.

The rotor 12, as shown in FIGS. 2 to 4, is uniformly tapered from a large cross-sectional area at its high ratio end 16 to a smaller cross-sectional area at its low ratio end 18.

The rotor 12 is made integral with and eccentric to an angular velocity input shaft 20 and is uniformly cam shaped in cross-section over its length, as shown in FIGS. 3 and 4. The cross-sectional shape of the cam of FIGS. 3 and 4, is suitable for operating the three drive shaft arrangements 14 at their 120° positions about the rotor.

The cross-sectional peripheral profile of the cammed rotor 12 is not limited to that shown in FIGS. 3 and 4 and is dependent on the number of drive shaft arrangements 14 or the like employed in the CVT machine as will become apparent from what is said below.

The rotor 12 carries, at each of its ends, a multi-component counterweight 22 which is fixed to the input shaft 20 for balancing the rotation of the eccentrically displaced mass of the rotor cam.

Figure 5:
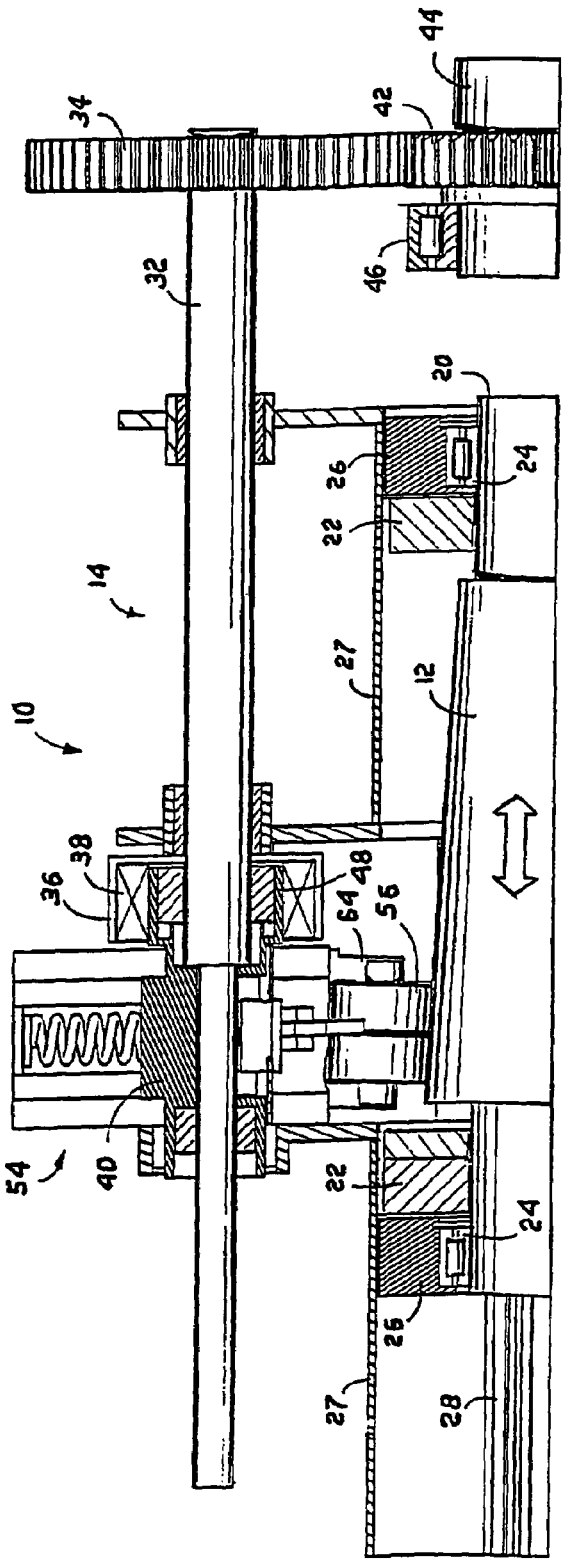
FIG. 5 is a half-side view of the FIG. 1 CVT shown sectioned.

The rotor input shaft 20 is journaled for rotation, as shown in FIG. 5, in bearings 24 which are carried in guide discs 26 which are situated on the shaft 20 adjacent the counterweights. The counterweights are obviously fixed to the rotor shafts 20. As shown in FIG. 5, the discs 26 are slidably located in guide tubes 27 which are fixed in the machine frame. The discs 26 are engaged with a key (not shown) in each of the tubes which extends over the length of the tubes to hold the discs against rotation relatively to the tubes 27.

A splined angular velocity drive shaft 28 is located in and projects from a bore 30 through the rotor input shaft 20. The projecting end of the shaft 28, shown on the left in FIG. 1 is driven, in use, by a prime mover such as a motor vehicle engine.

The drive shaft arrangements 14 are identical with each including, as shown in FIGS. 1, 5 and 6, a stepped drive shaft 32 which carries a fixed output gear 34, a sprag clutch housing 36 which is fixed to the shaft, a sprag clutch 38, and a cam follower rocker arrangement 40.

The drive shaft output gears 34 are each meshed with an output gear 42 of the machine. The gear 42 is fixed to an output shaft 44 which is rotatably supported in one or more bearings 46, as seen in FIG. 5, which are mounted in the machine frame, not shown.

On each of the assembled drive shafts 32, as shown in FIG. 5, the sprag clutch 38 is located in its housing 36 with its outer race locked to the housing by a key, not shown, with its inner race fixed to a cup 48 on the rocker arrangement 40. The rocker arrangement 40 is rotatable on bearings on either side of the diametrical step of the shaft 32.

The rocker arrangement 40 includes, as shown in FIG. 6, a rocker arm 50 which carries a cylindrical rocker 52 which is a component of a cam follower unit 54.

Figure 8:
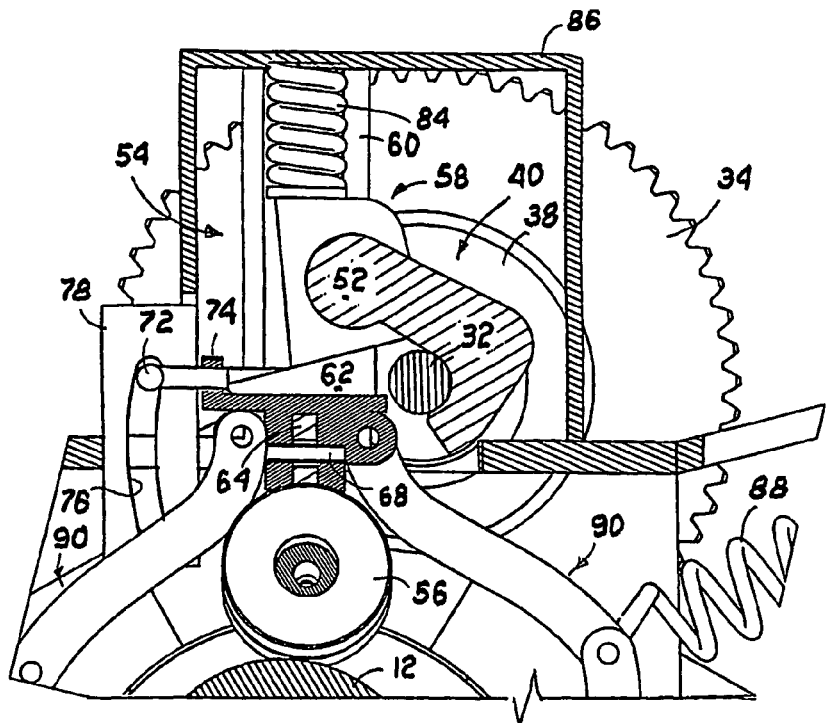
FIG. 8 is a sectioned end elevation of the FIG. 7 cam follower, in use.

The cam follower unit 54 includes, as shown in FIGS. 7 and 8, cam following rollers 56, a linear motion transmitter 58, a transmitter guide 60 and a linear motion compensating wedge 62.

The rollers 56 are freely rotatable on a common axle which is engaged with a swivel bridge 64, shown in FIG. 7. The bridge 64 has an arcuate upper surface and includes a centrally positioned curved slot 66.

The linear motion transmitter 58 guide 60 is U-shaped, as shown in FIG. 7, and includes a slot, not shown, in the underside of its base which is complementally curved to the arcuate upper surface of the roller bridge 64 and in which the bridge is located and held in place by a pivot pin 68, see FIG. 8, which passes through the slot 66 to enable the bridge and its rollers 56 to swivel about an axis which is normal to the roller 56 axle axis. This swivel capability of the rollers 56, allows the rollers 56 to remain in line contact with the cammed surface of the rotor while the rotor 12 is rotating and being moved in its axial direction relatively to the rollers, in use, and is fundamental to the invention.

The wedge 62 includes on its upper incline surface a centrally positioned buttress-like formation 70 from which an arm projects with the free end of the arm carrying a follower pin 72 which is normal to the axis of the arm. In the assembled cam follower unit 54, the underside of the wedge is slidably located on the horizontal upper surface of the transmitter guide 60 base with its arm passing slidably through a hole in a gabled flange 74 on the guide, as illustrated in FIG. 8. The pin 72 is slidably engaged in a curved slot 76 in a fixed frame component 78 of the machine.

The linear motion transmitter 58 is composed of two identically shaped holed bodies 80 and 82 which are each rotatably engaged with a projecting end of the cylindrical rocker 52 of the rocker arrangement 40 on either side of the rocker arm 50. The underside of each of the bodies 80 and 82 is angled complementally to and bears on the angled upper surface of the compensating wedge 62 on either side of the buttress formation 70 with this angle perhaps varying from machine to machine in dependence on the radius of movement and the length of stroke of the rocker 52 of a particular machine when measured from the axis of the drive shaft 32 on which it is mounted.

The composite linear motion transmitter 58 is reciprocatingly vertically slidable against and between the upright arms of the transmitter guide 60 and horizontally on the upper surface of the wedge 62, as shown in FIG. 8.

A compression spring 84 is located between the upper surface of the composite motion transmitter 58 and a formation, not shown, on the underside of a U-shaped frame bracket 86, as shown in FIG. 8. The spring biases all of the components of the cam follow unit 54 towards the rotor to ensure line contact of the rollers 56 with the cammed surface of the rotor and to prevent bounce of the rollers 56 during high angular velocity rotation of the rotor, in use.

Figure 9:
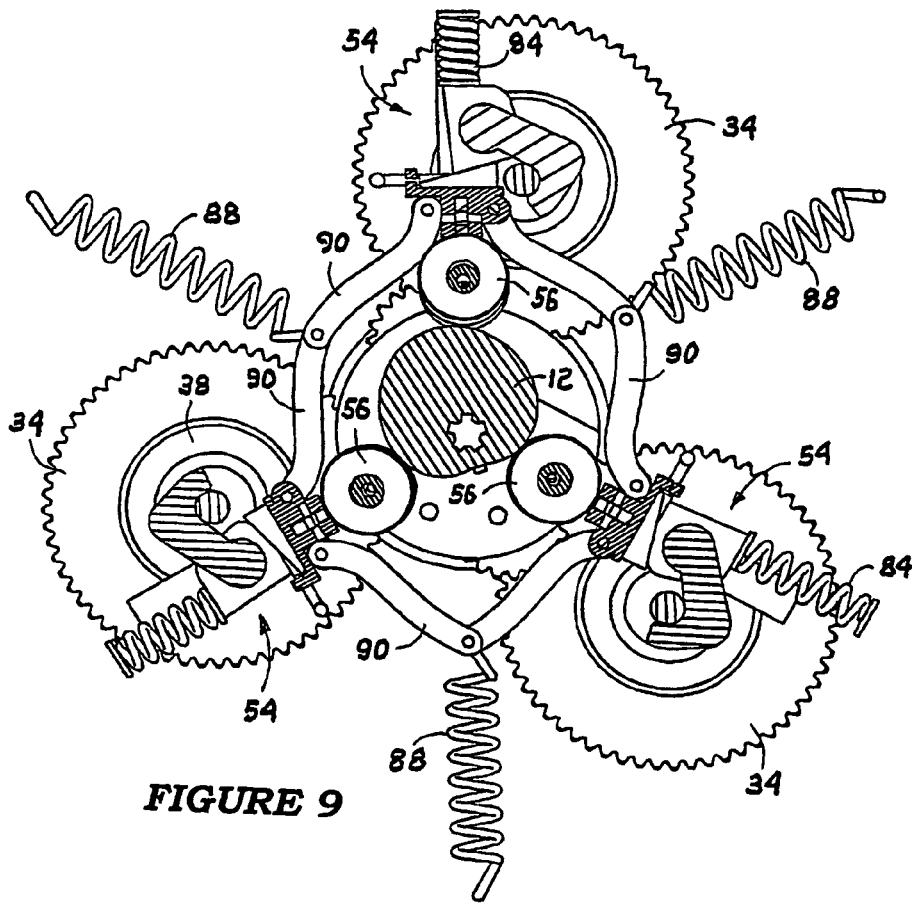
FIG. 9 is a sectioned end elevation of the CVT of FIG. 1 shown sectioned through its cam follower units.

Secondary biasing springs 88, best seen in FIG. 9, are connected in tension between the machine frame, not shown, and pairs of link arms 90 which are pivotally connected at their centres and, at their ends, to the motion transmitter 58 guides 60 of adjacent cam follower units 54 to further bias the cam follower units towards and onto the rotor 12.

In employing a single roller 56 or even the two rollers as illustrated in the drawings of this specification the taper of the rotor on which they are rotatable will expose the contact line of the or each roller, with the surface of the rotor, to differential speeds of rotation which extend over the length of the line which will cause slip of the roller treads on the rotor surface. Should the friction induced heat generation caused by this slip be problematical it may significantly be reduced by providing a composite roller 56 as illustrated in FIG. 7a. The FIG. 7a roller 56 includes multiple independently rotatable disc-like rollers with each having a curved rotor contact tread which is in point contact with the rotor 12 with the various contact points of the rollers being position on a line which effectively remains in roller line contact with the rotor.

During operation of the CVT transmission machine 10 of the invention the profiled shape of the rotor 12 and the bias of the springs 84 and 88 will cause the cam follow units 54 to be reciprocated in a radial direction which is substantially normal to the axis of the input drive shaft 28.

To ensure a linear conversion of the cam lift through the cam follower units 54 to the angular rotation of the rocker arrangement 40, the motion transmitters 58 will ride up the inclined surface of the wedges 62 on the upstroke of the rocker arrangement thus effectively increasing the angular rotation of the rocker arrangement 40 and in so doing solve the major part of the linear conversion. To compensate for the remaining error in linear conversion the wedges 62 are caused to slidably reciprocate, between the bases of the transmitter guides 60 and the motion transmitters 58, over a short stroke length (+2 mm to −1 mm) by horizontal movement of the pin 72 while being moved upwardly and downwardly in the curved frame slots 76 by the reciprocation of the linear motion transmitter guides 60. This linear conversion is more clearly explained in the mathematical dissertation below in connection with the operation of the cam follower units 54.

Returning to FIG. 3, it will be seen that the rotor 12 is symmetrical about a horizontal line 92 through the input shaft 20 bore 30 with the position of maximum lift and zero velocity of the cam followers, as shown in FIG. 8, being at the intersection of the cam surface with the line 92 on the left in the drawing and the position of minimum lift and zero velocity on the right as the cam is rotated in use, at any point in the length of the rotor, and like the cam follower unit is more fully described in the mathematical dissertation below.

As will be appreciated from FIG. 9, the three sets of rollers 56, and the cam follower units 54 which they operate, will each be reciprocated once by the rotor during each revolution of the input drive shaft 28 with the transmission power being imposed on the rockers 52 during the upstroke of the cam follower units 54. The sprag clutches 38 on each of the output shaft arrangements 14 are adapted to engage the cup 48 of each of the rocker arrangements 40 with the output shaft housings 36 in which they are located, only during the period of maximum velocity duration of the contact line of the rotor with the rollers 56 of the cam follower units 54. As will be explained below the cam profile of the rotor 12, in this embodiment of the invention, will provide a 120° duration of linear maximum angular velocity as well as 120° of linear minimum angular velocity which is applied through the components of the cam follower units 54 to the drive shafts 32 and the drive gears 34 which they carry. With the drive shafts 32 spaced at 120° intervals about the machine output gear 42 the gear 42 will be rotated sequentially in incremental segments (the duration of which is dependent on the current rotor axial position) of rotation to provide a linear angular velocity output of the machine output shaft 44.

The input/output ratio of the transmission machine is varied through its ratio range by moving the rotor 12 assembly backwards and forwards on the splined driven input shaft 28 relatively to the rollers 56 of the roller sets. The rotor is controllably moved relatively to the rollers by any suitable control means such as a lead screw arrangement or the like.

Figure 10:
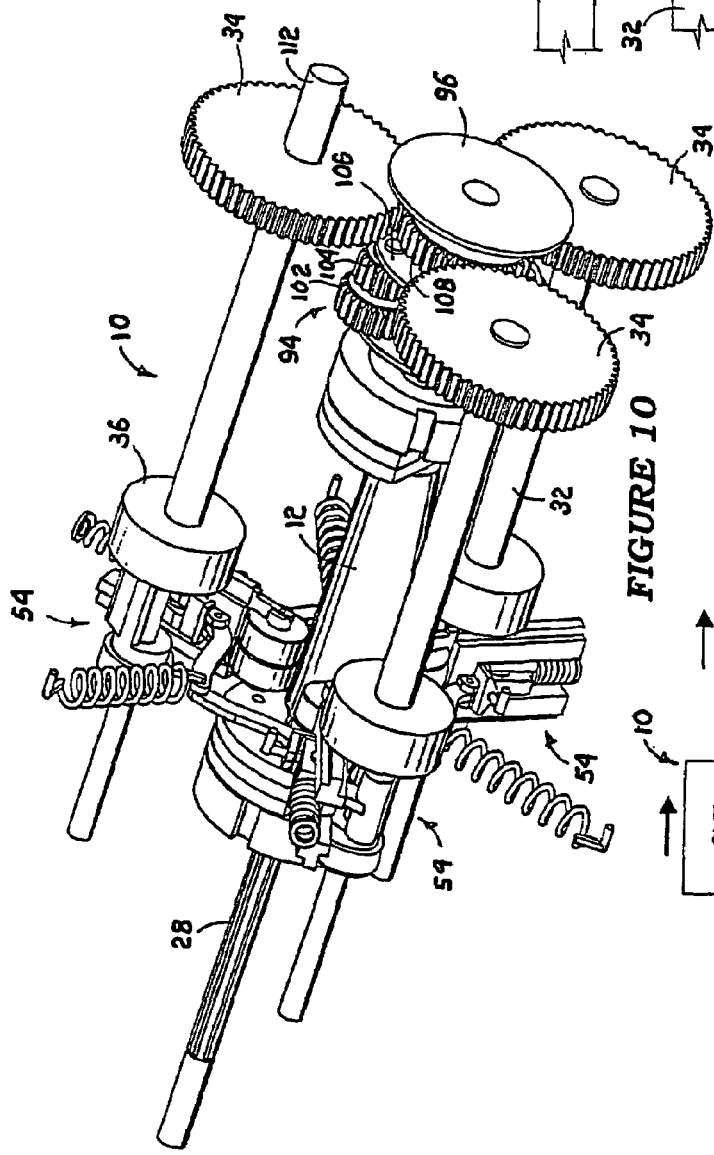
FIG. 10 is an isometric view of the FIG. 1 CVT which is modified to include an engine braking system.

The FIG. 10 embodiment of the CVT machine of the invention shows the FIG. 1 machine to include an engine braking arrangement which comprises a planetary gear system 94 and a braking disc 96.

Figure 11:
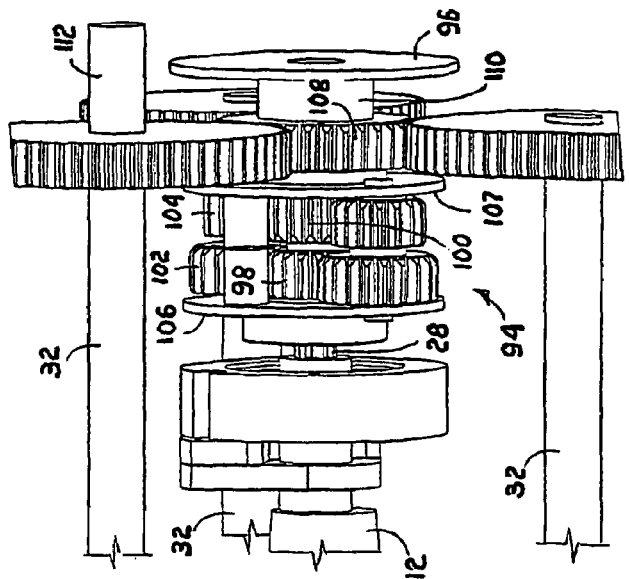
FIG. 11 is a fragmentary side view of the components of the engine braking system of FIG. 10.

The planetary gear system 94 is shown in FIG. 11 to include a first sun gear 98 which is driven by the splined input drive shaft 28, which in this embodiment of the invention passes completely through the rotor 12, a second sun gear 100, two pairs of planetary gears 102 and 104 which are attached to each other and are meshed with the sun gears 98 and 100 respectively. The planetary gear pairs 102 and 104 are rotatable on shafts which bridge and are fixed to the side plates 106 and 107 of a planet cage 94. The gear 42 of the FIG. 1 CVT machine has, in this engine braking system, been replaced by a gear 108 which is fixed to the outer side plate 107 of the planet cage and has a large diameter bore for a tubular shaft 110 which passes rotatably through it, and is fixed on opposite sides of the gear 108 to the braking disc 96 and the planetary system sun gear 100.

The CVT machine output shaft 112, in this embodiment of the invention, is provided by an extension of any one of the three output shafts 32, as shown in FIGS. 10 and 11.

The braking disc 96 may be braked by a conventional disc brake arrangement or by what is known in the trucking industry as a retarder.

Figure 12:
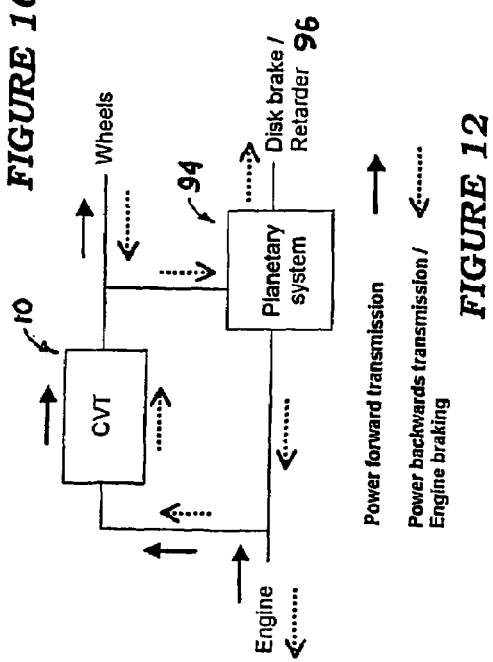
FIG. 12 is a block diagram of the FIG. 10 CVT illustrating its operation.

In use, when a vehicle including the CVT machine of the invention is travelling downhill and engine braking is required the braking disc 96 is braked to cause power to be applied by the vehicle wheels to the machine output shaft 112 and in a forward direction through the CVT 10, as shown diagrammatically in FIG. 12.

By braking the disc 96 a resistance torque is generated which will result in power being supplied, through the planetary system to the sun gear 98 and so through the splined drive shaft 28 to the rotor 12 and the vehicle engine through the drive shaft 28 while a circulating power loop is created from the rotor through the cam follower units 54 and back to the gears 34, as shown in FIG. 12 by the dotted arrows.

Regulation of the distribution of power applied from the output shaft 112 to the braking disc 96 and the vehicle engine may be achieved by a suitable selection of sun and planetary gears in the planetary system 94 to generate a circulating power effect through the cam follower units 54, their output shafts 32 and the machine output shaft 112. It is to be noted that power transmission through the cam follower units 54, during engine braking, is in the same direction as in normal power transmission as described with reference to FIG. 1 where power is supplied by the drive shaft 28.

The above braking system enables the CVT machine to engine brake without the need for the CVT machine to accommodate power transmission in both directions.

Figure 13:
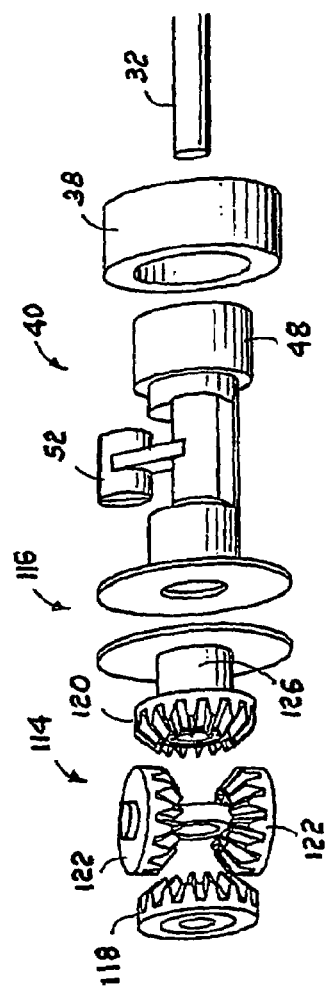
FIG. 13 is an exploded isometric view of the components of a second engine braking arrangement for use on the FIG. 1 CVT.
Figure 14:
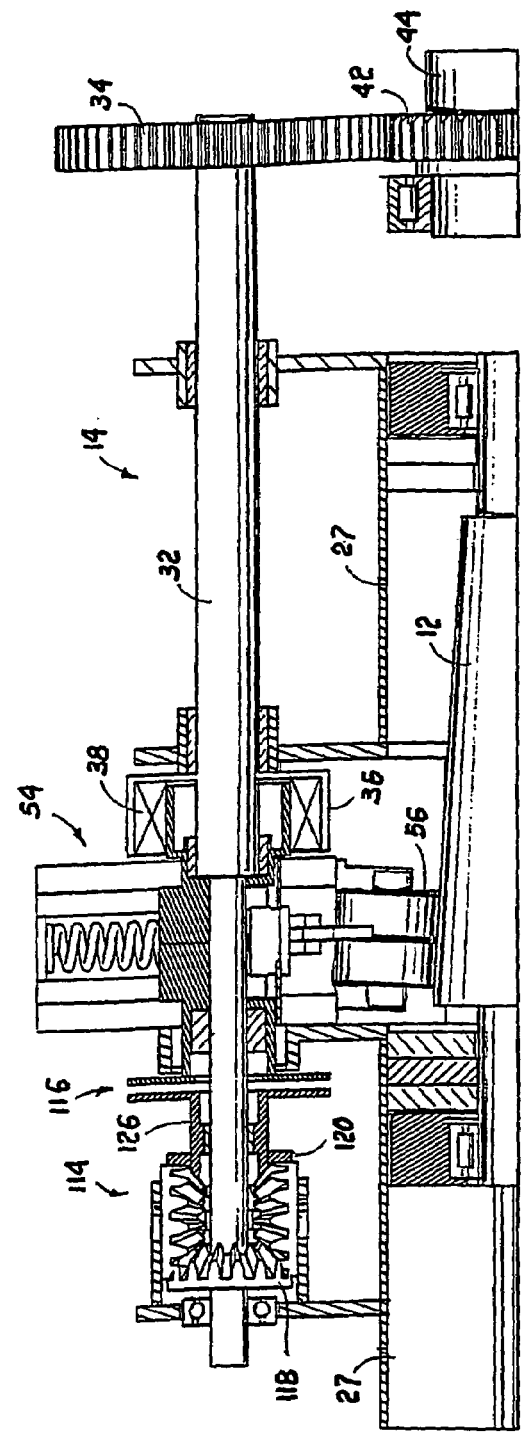
FIG. 14 is a sectioned half side elevation of the FIG. 1 CVT illustrating the location of the FIG. 13 components on a drive shaft of the machine.

The third embodiment of the CVT machine of the invention is shown in FIGS. 13 and 14 to include, on each output shaft 32, a second form of engine braking system which includes a gear arrangement 114 and an intermittently operable clutch 116.

When the engine power is being transmitted from the vehicle engine to its wheels through the CVT of the invention, as described with reference to the FIG. 1 embodiment, the rotor 12 power drives the cam followers 54 in their upstroke directions. Using the second engine braking system of the invention, as shown in FIGS. 13 and 14 it is required to transmit power from the cam followers 54 to the rotor. This is only possible during the down stroke of the cam followers 54 as the followers are incapable of "pulling" the rotor in their upstrokes.

The second engine braking system of the invention of FIGS. 12 and 13 is shown to include, as mentioned above, on each drive shaft 32, a gear arrangement 114 and an intermittently operable clutch 116. The gear arrangement 114 includes two bevel gears 118 and 120 and two pinion gears 122 which are freely rotatable between the bevel gears on a common axle 124 which, as shown in FIG. 13, has a holed centrepiece for passage of the drive shaft 32. The bevel gears are meshed with the pinions with the bevel gear 118 being fixed to the drive shaft 32 and the bevel gear 120 to a tubular shaft 126 which is attached to the rear plate of the clutch 116. The purpose of the gear arrangements is, during engine braking, to reverse the direction of partial rotation of the rocker arrangements 40 relatively to that of the drive shafts 32 on which they are located to cause the vehicle wheel rotated drive shafts 34 to power the rockers 52 of the rocker arrangements 40, in their down strokes, only on operation of the clutches 116.

As mentioned above with reference to FIG. 3 the cam profile of the rotor 12 is symmetrical about the line 92 in the drawing with the profile on a first side of the line, in normal engine drive through the CVT, lifting the cam followers in their rotor powered upstrokes. The second side of the cam merely supports the spring biased cam followers in their down strokes. In normal forward drive the clutches 116 are not activated.

During engine braking, when activated, vehicle wheel power needs to be transmitted by the cam followers 54 through the rotor 12 by the permanently contra-rotating bevel gears 120 and rear clutch plates which are driven by them. The clutches 116 are activated by the rotor through a timing arrangement, not shown, only once during each revolution of the rotor and then only while the cam followers 54 are following a portion of the second side of the rotor cam profile which corresponds to the 120° lift portion on the first side in their down strokes to power the cam follower down strokes onto the rotor. The three clutches thus sequentially cause the rotor to be powered for a full 360° of rotation on a single revolution of the splined input shaft 28 during engine braking.

The clutches 116 could be activated electronically or mechanically by means of engageable cam arrangements with their 120° periods of activation being timed by the rotor operated timing arrangement.

The requirements of the rotor 12 in the CVT embodiment of FIG. 1 is now described by means of a mathematical model.

A fundamental requirement of the rotor 12 is to provide through the CVT a constant angular velocity at the output shaft 44. To achieve this, as mentioned above, each of the cam follower units 54 must provide powered drive to its output gear 34 for each 120° of rotation of the rotor 12 during a single complete revolution of the input shaft 28.

During each of the 120° portions of rotation of the rotor 12, as sequentially picked up by the cam follower units 54, the cam follower transmitter guides 60 and the wedges 62 must generate a constant linear velocity of movement of the linear motion transmitters 58.

Figure 17:
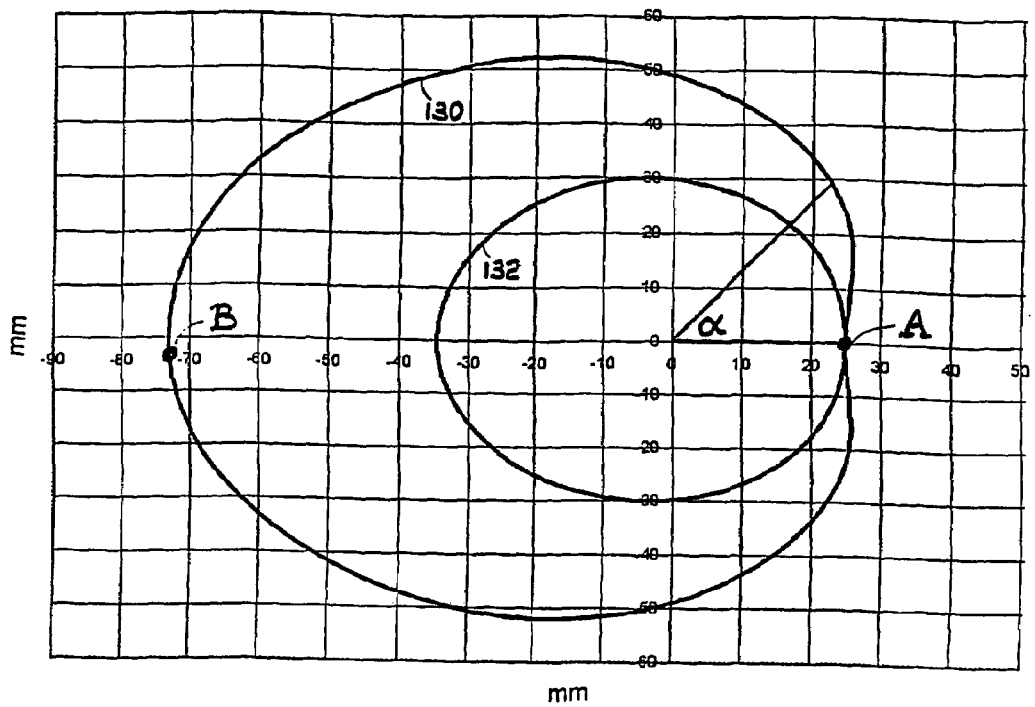
FIGS. 17 and 18 are plots of performance of the CVT rotor.

In engine braking, where power is required to be transmitted to the CVT from the normal output shafts 112 and 44, as described above with reference to FIGS. 10 and 12, the cam follower units 54 need to apply braking to the rotor in the 120° profile portion of the rotor, other than that used to power the cam follower units 54 on their upstrokes, with the same constant linear angular velocity. This requires that the rotor profile be symmetrical on opposite sides of the line 92 in FIG. 3. A mathematical function by which this is achieved is as follows:

$$R(\alpha) = R_{start} + R_{inc} \cdot \alpha \text{ mm} \tag{A}$$

Where α—Rotor 12 angular position as shown in FIG. 17.
R—Rotor radius, in mm, as a function of rotor angle, α,
$R_{start}$—Constant rotor radius, in mm, at the start of the constant rotor lift or drop rate rotor section
$R_{inc}$—Constant radius increase per degree of α, thus with units mm/deg.

Equation A is true for 30° to 150° of α, and thus to create a symmetrical profile the equation for α from 210° to 330° will be as follows:

$$R(\alpha) = R_{start} + R_{inc} \cdot (360 - \alpha) \text{ mm} \tag{B}$$

With equation A and B formulated as above, $R_{start}$ will differ in the two equations since $R_{start}$ in equation A will refer to the rotor radius at the beginning of the constant lift rate section and $R_{start}$ in equation B will refer to the rotor radius at the beginning of the constant drop rate section.

Figure 18:
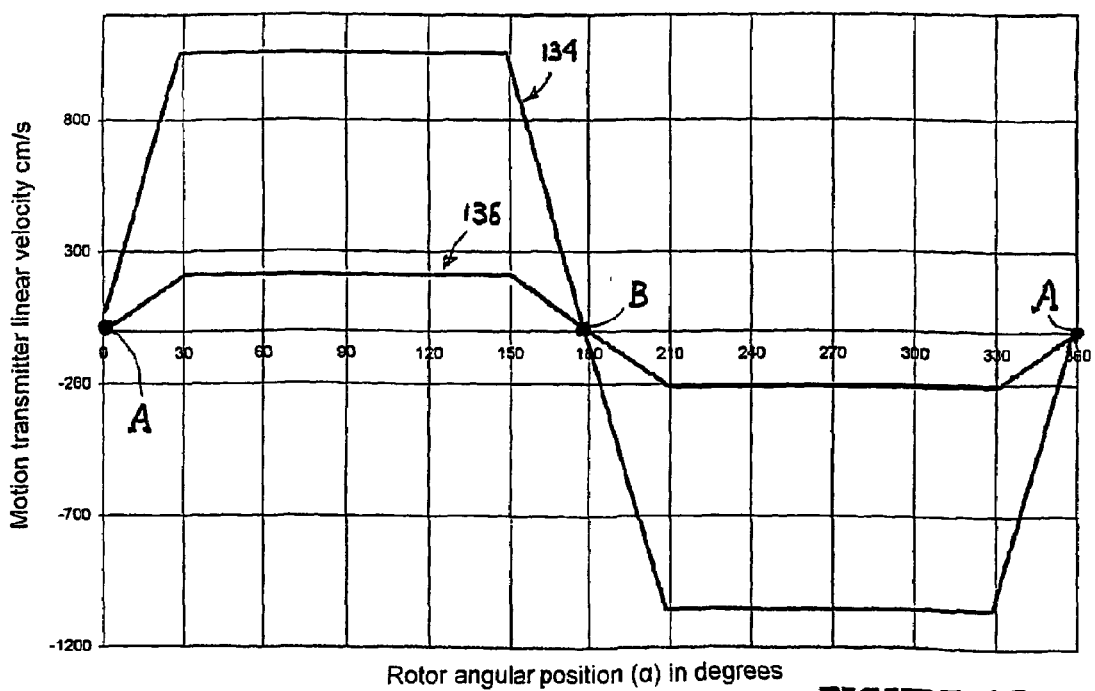

In order to create a smooth transition between the constant 120° lift/drop rate rotor sections, constant acceleration sections are built into the rotor at these intervals (see FIG. 18). Thus if the rotor 12 is rotating at a constant angular velocity of $V_{in}$, the linear velocity $V_{lin}$ of a roller 56 riding on the rotor 12 will be:

$$V_{lin} = \frac{R_{inc} \cdot V_{in} \cdot 360}{60} \text{ mm/s} \quad \text{for } 30° \leq \alpha \leq 150° \tag{C}$$

and $$V_{lin} = \frac{-R_{inc} \cdot V_{in} \cdot 360}{60} \text{ mm/s} \quad \text{for } 210° \leq \alpha \leq 330° \tag{D}$$

if the radial direction away from the input shaft 28 axis is taken as positive.

Since $V_{in}$ is a constant, $R_{inc}$ represents a value directly related to the linear velocity $V_{lin}$.

Figures 15, 16:
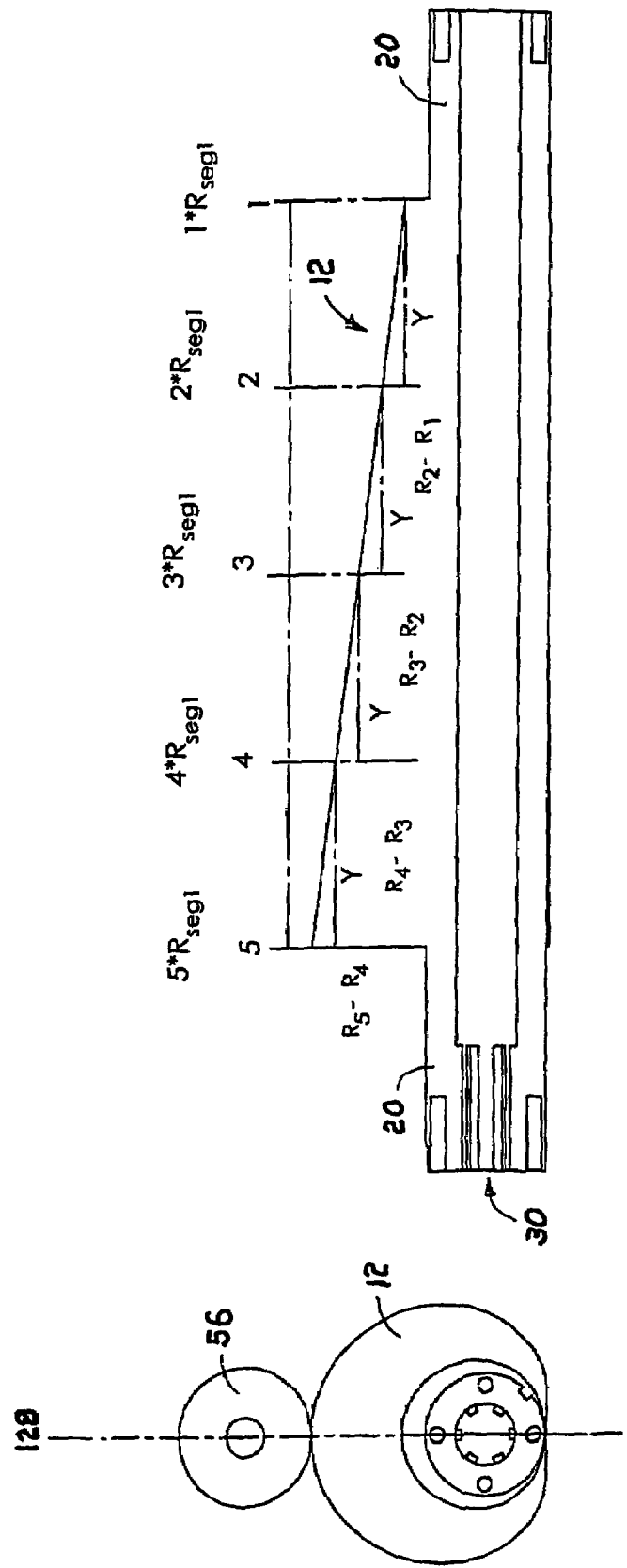
FIGS. 15 and 16 are respectively an end view of the CVT rotor as seen from the right hand side of FIG. 16 and an unhatched sectioned side elevation of the rotor of the CVT as used in a mathematical model of the rotor.

The following is proof that the contact between the rotor 12 and rollers 56 will always be a line contact:

If, as shown in FIG. 16, a cross-section of the rotor 12 is divided into say four equal segments of length Y mm and the value of $R_{inc}$ in the first segment is $R_{seg1}$ and the following segment increases linearly to be $2 \cdot R_{seg1}$ and so on to the end of segment 4 at 5. Therefore, in order to establish a line contact between the cam follower rollers 56, in the constant 120° lift/drop rate sections, and the rotor 12, the gradients for each segment, $\beta_{1\ to\ 4}$, with respect to the input shaft 28 axis, of each section of the rotor 12 must be equal (see FIG. 16) where the gradient is given as the radius difference between two consecutive segments divided by Y while using equation A as follows:

Segment 1: S1

$$\beta_1 = \frac{R_2 - R_1}{Y} = \frac{R_{start} + 2 \cdot R_{seg1} \cdot \alpha - (R_{start} + 1 \cdot R_{seg1} \cdot \alpha)}{y} = \frac{R_{seg1} \cdot \alpha}{Y}$$

Segment 2: S2

$$\beta_2 = \frac{R_3 - R_2}{Y} = \frac{R_{start} + 3 \cdot R_{seg1} \cdot \alpha - (R_{start} + 2 \cdot R_{seg1} \cdot \alpha)}{Y} = \frac{R_{seg1} \cdot \alpha}{Y}$$

Segment 3: S3

$$\beta_3 = \frac{R_4 - R_3}{Y} = \frac{R_{start} + 4 \cdot R_{seg1} \cdot \alpha - (R_{start} + 3 \cdot R_{seg1} \cdot \alpha)}{Y} = \frac{R_{seg1} \cdot \alpha}{Y}$$

Segment 4: S4

$$\beta_4 = \frac{R_5 - R_4}{Y} = \frac{R_{start} + 5 \cdot R_{seg1} \cdot \alpha - (R_{start} + 4 \cdot R_{seg1} \cdot \alpha)}{Y} = \frac{R_{seg1} \cdot \alpha}{Y}$$

Thus $\beta_{1\ to\ 4}$ are all equal and therefore result in a line contact for a given value of α in the above mentioned 120° sections. The acceleration sections in between the constant 120° lift/drop rate rotor sections are constant for a specific path around the rotor but decreases linearly from the larger cross section area to the smaller cross section area of the rotor (See FIG. 18) and thus line contact will also be maintained in these rotor sections over its length. This can further be proved by looking at the definition of the acceleration in FIG. 18 where the acceleration for example from 0° to 30° (which corresponds to a time duration linked to the angular velocity of rotor 22) is calculated by dividing the maximum velocity by this rotor duration. However for both the cases 134 and 136 the rotor duration is constant (0° to 30°) and only the maximum velocity differs. Thus the acceleration is a linear function of the maximum velocity. This reasoning can be applied to all the acceleration and deceleration rotor durations and thus line contact of the rollers 56 will be maintained with the rotor 12 in these sections, because of the linearity, at any position around the rotor 12 as well as any position along its axial length. This constant acceleration decreasing linearly over the length of the rotor may be replaced by any suitable function for acceleration as long as the same function for acceleration is applied over the length of the rotor, thus this invention is not limited to the abovementioned constant acceleration section on a specific rotor path.

However, the angle, $$\beta_{angle}(\alpha) = a \tan\left(\frac{R_{seg1} \cdot \alpha}{Y}\right)$$

represented by this gradient varies as a function of α. This makes the swivel action of the cam follower rollers 56 and the bridges 64 which carry them essential to the invention in maintaining line contact between the rollers 56 and the rotor 12 for different values of α.

As an example FIG. 17 illustrates a plot of the rotor profile at each end of the rotor 12. In the plot 130, $R_{inc}$=0.32 mm and the rotor minimum radius, $R_{min}$ around the axis as 25 mm. Assuming a rotor 8 length of $L_{rotor}$=300 mm, the line of contact angle, $\beta_{angle}$, is calculated as below for the constant 120° lift/drop rate rotor sections:

$$\beta_{angle}(\alpha) = a \tan\left[\frac{(R_{start} + 0.32 \cdot \alpha) - (R_{start} + 0.064 \cdot \alpha)}{L_{rotor}}\right] = \tag{E}$$

$$a \tan\left[\frac{0.256 \cdot \alpha}{300}\right] = a \tan[0.0008533 \cdot \alpha]$$

The invention is, however, not limited to using the same value for $R_{min}$ since a line contact is still maintained if using different values. For example if $R_{min}$ is varied in a linear fashion along the length of the rotor 12, a line contact will still be maintained.

FIG. 18 is a linear velocity graph 134 and 136, and FIG. 17 the corresponding rotor 12 profile 130 and 132 at which the linear motion transmitter guide 60 travels as a function of α for $R_{inc}$=0.32 mm and 132 for $R_{inc}$=0.064 mm respectively.

Referring to the corresponding points A and B in FIGS. 17 and 18, point A corresponds to a minimum rotor lift as well as the transition from the previous cycle rotor drop to the current rotor lift, thus with zero linear velocity of the followers as indicated by point A at α=0° as indicated in FIG. 18. Point B corresponds to a maximum rotor lift as well as the transition from the previous rotor lift increase to the current rotor drop, thus with zero linear velocity of the followers as indicated by point B at α=180° as indicated in FIG. 18. The constant rotor lift rate section is situated in this embodiment of the invention at 30°<α<150° and the constant rotor drop rate section at 210°<α<330° presenting the maximum and minimum linear velocities respectively of the cam follower unit 54.

This invention is not limited to the 60° section (see FIG. 18) or to an equal split in the acceleration and deceleration section, but may be any section in any split. An uneven split (for example increasing the deceleration section around α=180°) will reduce the bias force of the springs 84 and 88 (FIG. 8) since its purpose is to keep the line contact surfaces in contact with this only being crucial in the deceleration section at 150° to 210° (See FIG. 18). On the remaining sections of the graph the linear velocity is either constant or the components in the transmission train are accelerated by rotor 12. Increasing the duration in above mentioned sections would thus imply a smaller deceleration, thus the force necessary to hold the surfaces together will be reduced and therefore also the spring sizes and bias force which would greatly enhance performance at high rpm's.

The width of the combined rollers 56 have no influence on the linear velocity of the transmitter guide but only depend on the swivel point of rollers 56 relative to the rotor length. This invention is also not limited to two rollers 56, as used in this embodiment of the invention, but may be any reasonable number as illustrated in FIG. 7a.

The function of the linear velocity conversion arrangement of the cam follower units 54 is now described by way of a mathematical model.

Figure 19:
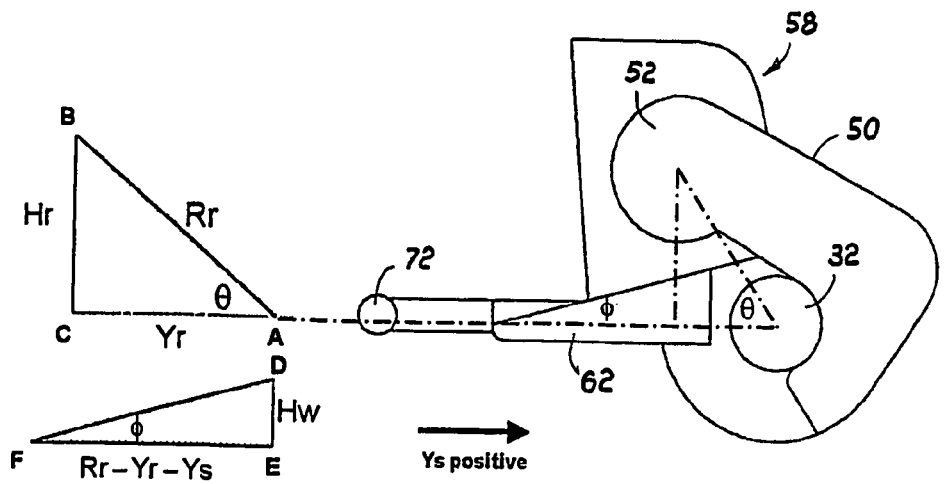
FIGS. 19 and 20 are respectively a diagrammatic side elevation of components of the cam follower of FIG. 7 and a graph illustrating the effect of the FIG. 19 components on the operation of the cam follower.

FIG. 19 represents the angle θ between a line AB which intersects the axes of the drive shaft 32 and the rocker 52 and a line AC which is parallel to the underside of the wedge 62. The line BC in the enlarged triangle is perpendicular to the line AC and is parallel to the direction of reciprocation of the transmitter guide 60.

From triangle ABC the following equations can be arrived at:

$$\sin(\theta) = \frac{Hr}{Rr} \quad (F)$$

$$\cos(\theta) = \frac{Yr}{Rr} \quad (G)$$

Where Rr—Radius of rocker
Yr—Horizontal component of Rr
Hr—Vertical component of Rr
θ—Angle between horizontal and Rr From triangle DEF, which represents the wedge 62 the following equations can be arrived at:

$$\tan(\phi) = \frac{Hw}{Rr - Yr - Ys} \quad (H)$$

Where Hw—Vertical movement upon movement of the wedge 62 from the zero position
when Hw=0 at θ=0
Ys—Horizontal movement of the wedge in the horizontal direction, with the arrow G indicating the positive direction, upon movement of the wedge away from the zero position at θ=0 when Yr=Rr and thus Ys=0

The total compensated horizontal movement, Hs, of point B is calculated as:

$$Hs = Hr + sg \cdot Hw \quad (I)$$

Where Hs—total compensated horizontal movement of point B
Sg—Indication of vertical position of point B. When sg=1 then θ and point B is above line AC as in FIG. 19 and when θ and point B is below line AC sg=−1.
Hr—as indicated above
Hw—as indicated above The desired linear relationship between θ and Hs can be written as $$\theta = \frac{Hs}{Rr} \quad (J)$$

By combining equations F to J an equation for Ys in terms of Hs can be written as:

$$Ys = \frac{-\left(\begin{array}{c}-\tan(\phi) \cdot Rr \cdot sg + \tan(\phi) \cdot \cos\left(\frac{Hs}{Rr}\right) \cdot \\ Rr \cdot sg + Hs - \sin\left(\frac{Hs}{Rr}\right) \cdot Rr\end{array}\right)}{sg \cdot \tan(\phi)} \quad (K)$$

Figure 20:
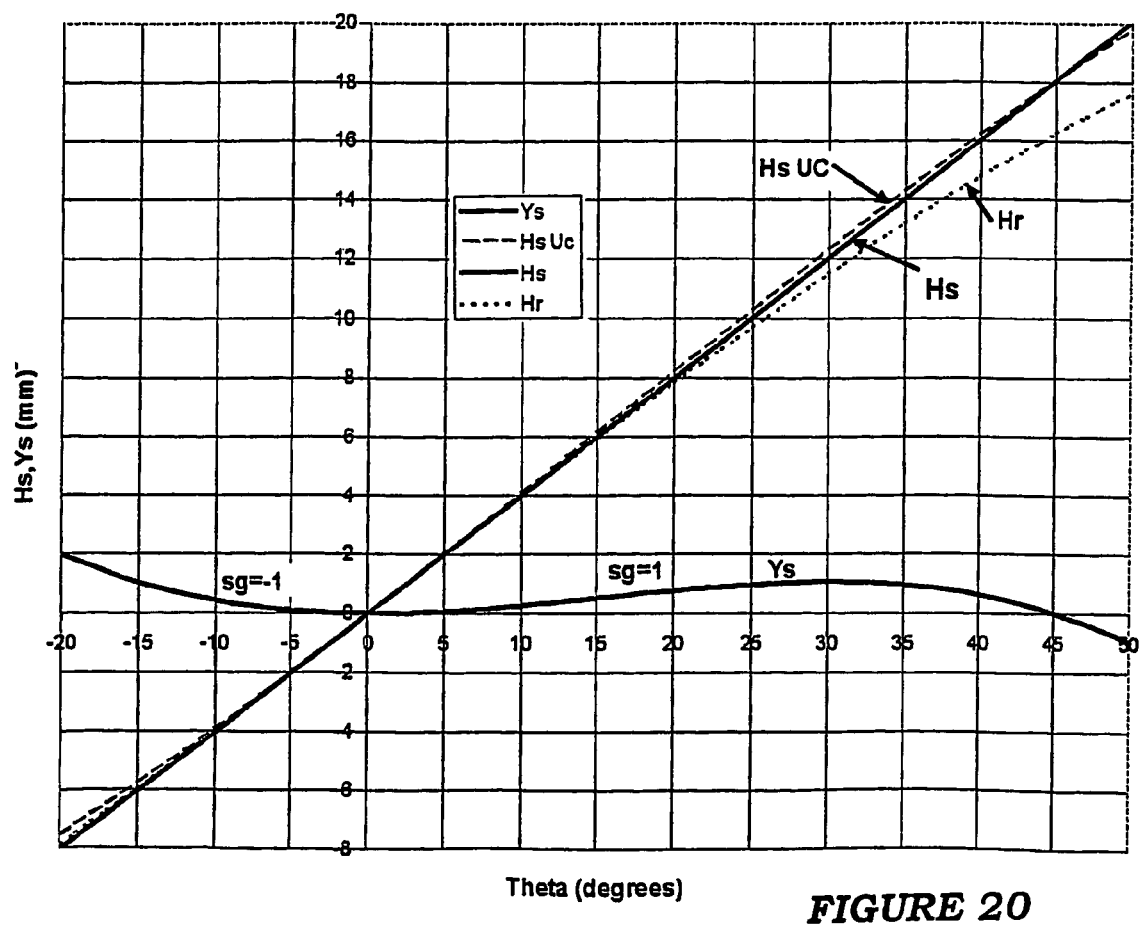

As an example FIG. 20 presents a plot of θ versus Hs, Ys, Hs_Uc and Hr which was calculated with Ys=0 thus no compensation of the wedge 62 relative to the transmitter guide 60. The following values were used:
Rr=23 mm
φ=15°

From FIG. 20 it can be seen that the relative movement of the wedge 62 relative to transmitter guide 60 for θ varying from −20 to 50°, a 70° duration, results in Ys varying only from 2 to about −1 mm. Hs-Uc presents the plot with Ys activated (wedge 62 moving relative to transmitter guide 60) thus indicating the minimal correction needed by Ys to achieve Hs. Hr illustrates the plot with no wedge 62 compensation. (Ys=0)

Typically in using above linear conversion to rotational motion the midpoint of rotor 12 lift in the maximum rotor stroke axial position will coincide with θ=50°−70°/2=15°.

A second embodiment of the CVT machine of the invention is illustrated in FIGS. 21 to 25.

This machine operates by means of a 180° constant lift rate rotor 138 in place of the FIG. 1 120° rotor. The cam profile 140 of the rotor is shown in FIGS. 22 and 23.

The CVT machine, of this embodiment of the invention, is shown in FIG. 24 to include a frame having two identical side plates 142, only one of which is shown in FIG. 24, the rotor 138, two cam followers 144, as a result of the 180° rotor, and a planetary gear assembly 146 which is located on the output shaft 148 of the machine. The machine input shaft is, as is the case in the FIG. 1 embodiment, a splined input shaft, not shown, which passes through the rotor 138 and is driven by any suitable prime mover.

The cam followers 144 are identical to each other and each includes a pair of rollers 56 and a swivel bridge 64 arrangement which is identical to those of the FIG. 1 embodiment, a U-shaped swinging arm arrangement 150 and a chain sprocket 152.

The swinging arm arrangements 150 of each of the cam followers includes a pair of parallel arms 154 which are joined to each other at one end by a connector body 156 which includes the arcuate groove in which the roller bridge is swivelable about a swivel pin on an axis which is normal to that of the rotor 138. The chain sprockets 152 are freely rotatable.

The gear assembly 146 is shown in FIG. 25 to include a cage gear 158, two partial chain sprocket units 160, two sprag clutches 162, sprag clutch housings 164 and a chain tensioning gear 166. All of these components with the exception of the chain tensioning gear are carried on the machine output shaft 148.

The cage gear 158 carries in an oblately shaped aperture, as shown in FIG. 25, two pinion gears which are freely rotatable on axles which extend between and are fixed to a central tube ring 168 and an edge of the cage aperture.

The chain sprocket units 160 are each composed of a tube ring 170 to which the partial sprocket 172 is fixed. The rings 170 are freely rotatable on the output shaft 148. The sprocket teeth are positioned in eccentric paths about a central aperture in the sprocket units. The direction of eccentricity of the sprockets are opposite to each other with the degree of eccentricity of each of the sprockets being a little different from each other to cater for a difference in the paths of the two chains 174 and 176. The unit 160 central aperture about which the sprocket teeth are located houses a bevel gear 178 which is integral with the unit.

In the assembled gear assembly 146, the bevel gears 178 are meshed with the cage gear pinions, the inner races of the sprag clutches 162 are located over and engaged with the sprocket unit 160 tube rings 170 with their outer races located in and engaged with the clutch housings 164. The clutch housings 164 are fixed to the machine output shaft 148.

In the assembled CVT machine, as shown in FIG. 24, shafts which are fixed to the free ends of the cam follower swinging arms 154 are pivotable in bushes in the frame side plates 142. A first end of each of the chains 174 and 176 is fixed to a shaft which extends between the side plates 142. The chain 174 passes over the upper cam follower sprocket 152 and over the sprocket teeth of a sprocket unit 160 with its second end anchored to a holed lug 180 on the sprocket. The chain 176 follows the same path over the lower cam follower sprocket 152 and the partial sprocket of the second sprocket unit 160 but in an opposite direction to that of the chain 174.

The ends of the machine output shaft are journaled for rotation in bearings, not shown, in the frame side plates 142.

The chain tensioning gear 166 is fixed to a shaft 182 which is spring loaded against rotation by a suitable rubber or like torsion arrangement or springs. The gear 166 is engaged with the cage gear 158, as shown in FIG. 24.

The rotor 138 is, as is the case with the rotor of the FIG. 1 embodiment, movable by any suitable control means between the cam followers 144 and through apertures in the frame side plates 142.

In operation, the two chains 174 and 176 are arranged in such a way around the partial sprockets 172 of the sprocket unit 60 that when the one cam follower 144 is being moved away from the input shaft axis by the cam profile of the rotor 138 the other cam follower 144 is being moved on the rotor by its chain towards the input shaft axis. During rotation of the rotor 138 the two partial sprockets 172 of the units 160 will be partially rotated in opposite directions. The sprag clutches 162 are configured in such a way as to engage the sprag clutch housings 162, during their 180° constant lift rate engagement periods, and so the machine output shaft 148, whenever the respective sprocket unit 160 is being partially rotated in the direction indicated by the arrow in FIG. 24.

Since the constant cam lift rate of the rotor 138 is 180° very little relative movement of the sprocket units 160 in opposite directions will occur during the rotation of the rotor 138 in a given axial position of the rotor 138 between the cam followers 144. Since the cage gear 158 forms a planetary gear system with the partial sprocket units 160 the above relative movement of the sprocket units 160 will be converted to oscillation of the tension gear 166 and its shaft 182. The tension gear shaft maintains chain tension when the respective sprag clutches are not engaged, during rotation of the rotor 138. This chain tension arrangement eliminates the need for other spring devices or the like to keep the cam follower rollers 56 in line contact with the rotating rotor 138 and takes advantage of the relative motion between the cam followers 144 in order to minimise the travel or capacity of the torsion bar or spring arrangement used by the shaft 182 to maintain chain tension and contact of the rollers 56 with the rotor 138.

In order to compensate for the swinging motion of the cam follower units 44 which is induced by the swinging arm arrangements 150 (which alters the contact point of the rollers 56 with the rotor 138) and the varying chain angles as the rotor 138 is rotated to enable each of the partial sprockets 172 of the sprocket units 160 to be custom made to include varying radius sprocket teeth. The above will ensure linear conversion of the rotor angle to output shaft angle during the 180° constant lift rate rotor section.

Another advantage of this embodiment is that the stroke of the rotor 138 is increased by the chains rolling over the cam follower idler sprockets 152 so that the chain stroke over the partial sprockets of the sprocket unit 160 is greater than the rotor stroke which allows for a greater partial sprocket 172 varying radius.

The invention is not limited by employing the swing arm arrangements 150, but may operate in the same manner as the transmitter guides 60 in the first embodiment, by utilising radial slides of each cam follower unit 54.

The linear conversion of the cam lift through the cam followers 144 to rotary motion of the partial chain sprocket units 160 is achieved in this embodiment of the invention by the chain action on the variable partial sprockets 172 and 178 respectively, with this compensating for the chain angles and lever action of swinging arms 154.

A third embodiment of the rotor controlled CVT of the invention is shown in FIGS. 26 and 27 to include a box-like housing 184, two angular velocity profile generators 186 and 188, a rotor 138, an angular velocity output arrangement 190 and a machine output shaft 192 which could be either of the generator 186 or 188 output shafts 192.

The rotor 138 is the same as the 180° rotor 138 of the second embodiment of the CVT and carries on input shafts 194 at each of its ends counter-weights 196 for counterbalancing the eccentric mass of the rotor during rotation.

The angular velocity profile generator 186 is shown in FIG. 28 to include a crank 198, a roller swivel 200, rotor contact rollers 202, holed arcuate drive segments 204, two holed guide elements 206, a sprag clutch 208, a belt drive gear 210 and a biasing spring 212. The profile generator 188 is identical.

The crank 198 includes two crank arms 214, a tubular bridge member 216 and two tubular trunnion shafts 218. Each of the crank arms carries an arcuate slot 220.

The roller swivel 200 includes a central plate which carries at each of its ends a swivel shaft 224 on each of which an arcuate drive segment 204 and a guide element 206 is rotatably located. The central plate of the roller swivel additionally carries, at its centre, an axle 226 which projects from opposite faces of the plate. The rollers 202 are engaged with and rotatable on the axle 226 on opposite sides of the central plate. The rotor swivel 200 with its rollers 202 are located between the arms 214 of the crank 198 with the swivel shafts 224 projecting through the slots 220 with the arcuate segments 204 on them located in the slots 220 in which they are a nice sliding fit. The guide elements 206 on the outer ends of the shafts 224 are slidably engaged, as is shown in FIG. 26, in vertical guide slots 228 in the opposite side walls of the housing 184.

As will be seen in FIG. 27, the two cranks are inverted relatively to each other in the housing so that the arcuate slots 220 in the crank arms 214 are oppositely curved.

The crank trunnion shafts 218 are journaled for rotation in the same housing side walls that carry the vertical slots 228 with the roller swivel 200 rollers 202 resting on opposite sides of the rotor, as shown in FIG. 27. The springs 212 are engaged with the central plates of the swivel rollers to act between the swivels and a frame component (not shown) which is fixed to and extends across the upper and lower open ends of the housing to bias the pairs of swivel rollers 202 into cam following line contact on opposite sides of the rotor.

The belt drive gear 210 of the output arrangement 190 carries a sprag clutch housing 230 which is located in a recess in and attached to the gear 210. The machine output shafts 192 are coaxially located in and fixed to the gear. The inner race of the sprag clutch 208 is located on and fixed to one of the crank trunnion shafts 218 of each of the profile generators with the portion of the output shaft 192 which is located in the sprag clutch housing 230 rotatably located in the trunnion shaft 218 with the sprag clutch housing 230 then being positioned over and fixed to the outer race of the sprag clutch 208. A flexible internally and externally grooved endless drive belt 231 of the output arrangement 190 is located over and engaged with the belt drive gear 210 of each of the profile generators, as shown in FIG. 27. The free loop of the belt below the lower gear 210 in the drawing is engaged with a suitable belt tensioning device, not shown.

The rotor 138 is movable in the axial direction of the rotor input shaft by any suitable external control means to vary the position of the angular velocity profile generator rollers 202 on the cammed surface of the rotor between its high ratio range position as shown in FIG. 27 and its low range position at the other end of the rotor at which the cam stroke of the rotor is altered to alter the drive duration of the sprag clutches and so the drive duration of the crank 198 and so through the sprag clutches 208 that of the output shaft 192.

In operation, during rotation of the rotor 138, the swivel roller 202 pairs rotate, under the bias of the springs 212, in line contact with the cammed surface of the rotor while one of the profile generator roller 202 pair is simultaneously being moved in a radial direction, by the lift stroke of the rotor cam, away from the rotor axis and the other roller pair is being moved towards the rotor axis.

During radial movement of the roller swivels 200 on the rotor the square guide elements 206 which they carry will guide the swivels 200 in their radial paths of motion by reciprocating in the housing slots 228 in which they are slidably trapped. The arcuate segments 204, which are rotatably located on the roller swivel shafts 224, will simultaneously drive the crank arms 214 in their reciprocal strokes about the crank axis 234 while at the same time slightly rotating relative to crank arms 214 about their axes by their sliding movement in the curved crank arm slots 220 to alter the effective crank radius to produce a linear conversion of the radial displacement of the swivel shafts 224 to angular rotation of the crank 198.

The linear conversion of drive from the linear motion of the rotor swivels to the angular velocity of the crank 198 is accomplished, as mentioned above, by the rotatable motion of the arcuate drive segments 204 in the crank arm slots 220. The action will be more precisely explained in the mathematical model below.

During the 180° portion of constant cam lift action of the rotor the sprag clutches 208 will sequentially engage the output shafts 192 via the sprag clutch housings 230 to each provide an incremental drive of the output shafts to result in a driven rotation of whichever of the shafts 192 is used as the machine output shaft for a full 360° rotation of the rotor.

As mentioned above the ratio between the CVT machine input shaft and whichever of the output shafts 192 is used as the machine output shaft is achieved by moving the rotor relatively to the swivel rollers 202 between its high and low range ratio positions.

This embodiment of the invention is not limited to the arcuate drive segment 204 which may be replaced by an eccentric holed circular bush, while slot 220 may be replaced by a mating circular hole.

The function of the linear drive conversion of the rotor swivels 200 to the crank 198 is now explained by means of the following mathematical model.

Figure 29:
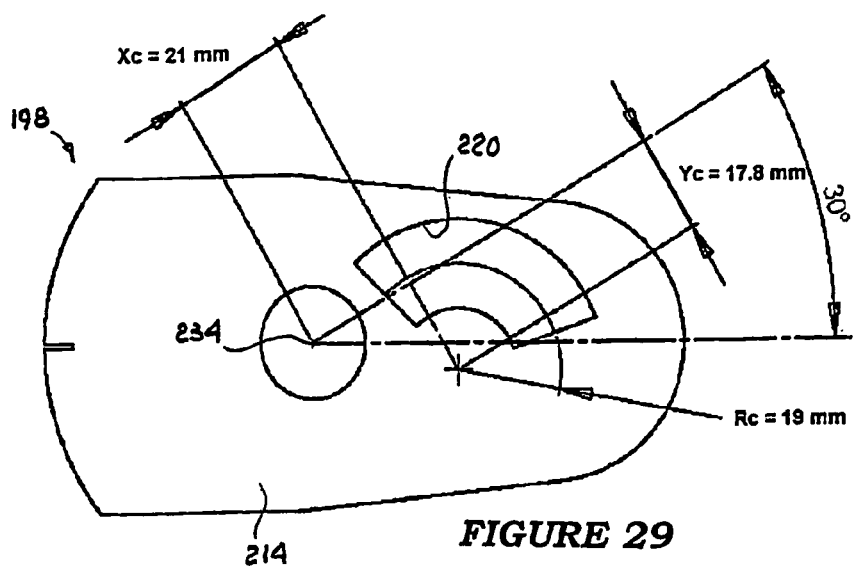

As shown in FIG. 29 the radius Rc of both of the arcuate slots 220 in the crank arms 214 and the arcuate drive segments 204 which are slidably trapped in them during operation of the linear conversion arrangement as well as Rc centre point Xc, and Yc are explained below. Rc thus represents the radius on which the axis of swivel 224 travels during rotation of the rotor 138.

Figure 30:
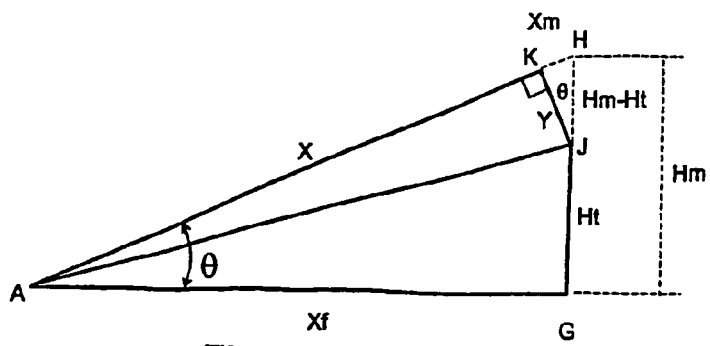

FIG. 30 is a diagram of the variables related to the mathematical model, in which the following are:

A—the point at the axis 234 of the cam 198 trunnions 218

GJ—represents the line along which the axis of the swivel shaft 224 travels

J—the current position of swivel shaft 224 axis

Ht—the distance travelled by the swivel shaft axis above the horizontal line AG

Xf—the effective radius of conversion, thus the distance between A and the centre line of slots 228.

θ—the desired angle for converting the height Ht to θ in a linear fashion

Hm—is the desired effective height for linear conversion

AH—a line on the crank 198 arm 214 which represents the base line from which position J is measured relative to crank 198 arm 214 by referring to the X and Y co-ordinates.

KJ—a line perpendicular to line AH to intersect line GH at J

Xm—the distance between point K and H.

The linear conversion between θ and Ht can be written as the following with Xf being the effective radius of conversion:

$$\theta = \frac{Ht}{Xf} \quad (L)$$

From triangle AGH the following can be written:

$$\tan(\theta) = \frac{Hm}{Xf} \quad (M)$$

From triangle KJH the following can be written:

$$\cos(\theta) = \frac{Y}{Hm - Ht} \quad (N)$$

and $$\sin(\theta) = \frac{Xm}{Hm - Ht} \quad (O)$$

Using equations L to O and triangles AKJ and AJG, equations for X and Y in terms of θ and Xf can be derived as follows:

$$X = [(\theta \cdot Xf)^2 + Xf^2 - Y^2]^{0.5} \quad (P)$$

$$Y = \cos(\theta) \cdot \tan(\theta) \cdot Xf - \cos(\theta) \cdot \theta \cdot Xf \quad (Q)$$

Figure 31:
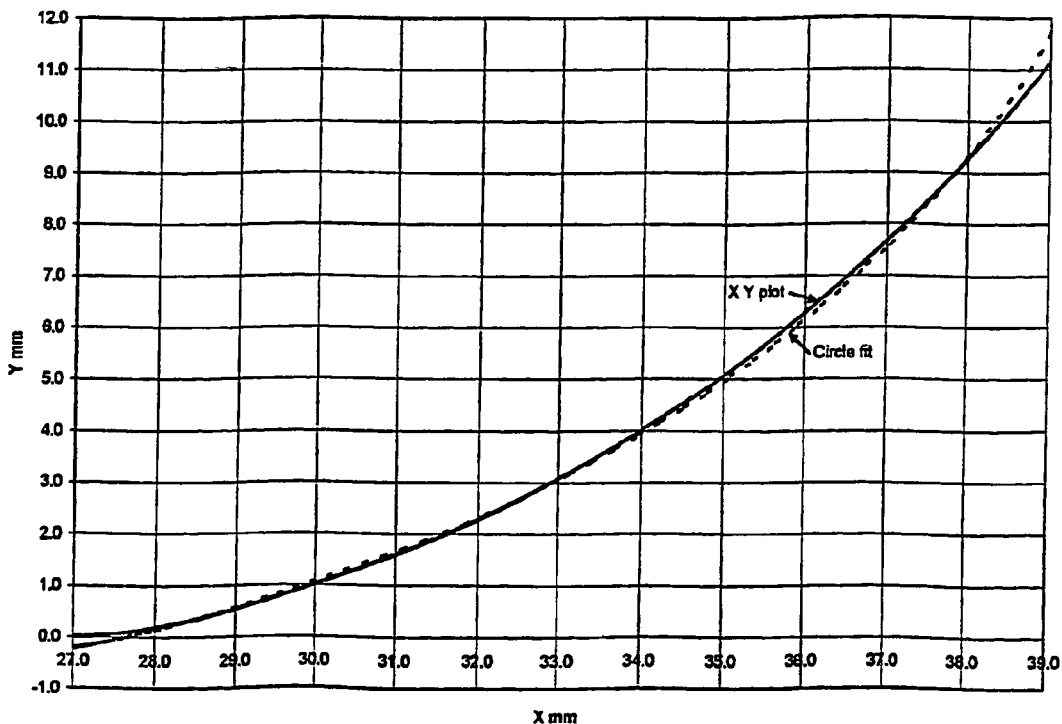

As an example FIG. 31 illustrates a plot of Y versus X for values of θ from 0° to 65° for Xf=27 mm. (Note that equations P and Q use θ in radians). Also shown in FIG. 31 by the dotted line is a circle fit to the curve of Y versus X with radius Rc=19 mm and centre point co-ordinates Xc=21 mm and Yc=17.8 mm. FIG. 29 shows these values as related to the dimensions and position of slot 220. The slot position in FIG. 29 is offset from the horizontal line by 30° in order to provide an even stroke above and below the line of 30°.

The above serves as an example of a linear conversion from linear motion to rotational motion using a very simple method while maintaining surface contact between the moving surfaces which results in low stresses and makes this embodiment of the invention suitable for practical implementation.

However, this embodiment of the invention is not limited to above values and circle fit but may include any values as well as any suitable curve fit to suit a specific requirement. This invention is further not limited to a linear conversion between linear motion and rotational motion but may include any conversion curve to suit a specific application.

This invention is not limited to an external rotor 12 but may include an internal rotor (a tube with its internal surface suitably cam profiled and radially inwardly tapered over its length) with the same properties as rotor 12 with cam followers and their rollers 56 running on the inside of the tube cam.

The invention claimed is:

1. A rotor controlled CVT comprising:
   an input shaft,
   an output shaft,
   a cam-shaped rotor which is elongated in its axial direction, is uniformly and linearly tapered over its length and is rotatably engaged with the input shaft,
   a plurality of cam followers which are located in fixed structure about and are reciprocated by the rotor,
   angular velocity extraction devices which are each connected to a rocker arm which is engageable with and partially rotated by a cam follower,
   means connecting the extraction devices to the output shaft so that the output of the extraction devices will collectively produce an output velocity at the output shaft for each revolution of the input shaft and
   means for moving the rotor and the cam followers relatively to each other to vary the ratio of rotation of the output shaft relatively to the input shaft
   each of the cam followers include a roller which has a flat tread surface which is in line contact with the surface of the rotor and is rotatable in a circumferential path on the rotor surface on an axis which is parallel to the tapered surface of the rotor, an interactive component assembly which is located between each of the rollers and a rocker arm with the interactive component assembly further including a roller carrier which supports an axle about the axis of which the roller is freely rotatable and which is mounted in the assembly for pivotal movement on an axis which is normal to the axis of rotation of the roller, and
   means for keeping the tread surface of the roller in line contact with the rotor surface as the rotor and the cam followers are moved relatively to each other, in use.

2. A CVT as claimed in claim 1 wherein each of the cam followers includes a plurality of rollers which are rotatable on the rotor surface about a common axis which is held parallel to the tapered surface of the rotor by the roller contact means with their tread contact lines being aligned on the rotor to be parallel to the common axis of rotation of the rollers.

3. A CVT as claimed in claim 1 wherein the roller contact means includes biasing means which biases the cam follower towards the rotor.

4. A CVT as claimed in claim 1 wherein the interactive component arrangement of each of the cam followers, in following the cross-sectional cam profile of the rotor, is reciprocated by its roller in a radial direction relatively to the rotor axis and includes the interacting component assembly for providing a linear conversion of the radial movement of the cam followers to partial rotational movement of the components of the extraction devices which they drive.

5. A CVT as claimed in claim 1 wherein the rotor tapers from a large cross-sectional area at one end to a smaller cross-sectional area at its other end with its uniform cross-sectional peripheral profile including sections of cam lift that respectively linearly increase at a constant rate with the corresponding change in rotor angle to coincide with the peripheral sections in which the respective extraction devices are engaged in a specific cam follower roller path around the rotor with the constant rate decreasing linearly from the large to the smaller cross-sectional area of the rotor.

6. A CVT machine as claimed in claim 5 wherein the minimum radius (RMIN) of the rotor, relatively to the rotor axis, tapers linearly over the length of the rotor from its smaller cross-sectional area end to its large cross-sectional area end.

7. A CVT machine as claim 1 wherein the angular velocity extraction devices are sprag clutches and each of the cam followers is connected through a sprag clutch to a drive shaft which carries a fixed drive gear with the drive gears each being meshed with a common output gear.

8. A CVT as claimed in claim 7 wherein the cam follower interactive component assembly each include a linear motion transmitter which is movable in a radial direction relatively to the rotor [12] axis of rotation.

9. A CVT as claimed in claim 8 including a rocker arrangement [40] which is freely rotatable in one direction on each of the drive shafts, a rocker arm on each of the rocker arrangements, a pivot head on the free end of each rocker arm which is pivotally attached to a motion transmitter so that radial movement of the motion transmitters is translated by the sprag clutches into partial angular velocity rotation of the drive shafts in a direction opposite to the free rotation direction of the sprag clutches.

10. A CVT as claimed in claim 9 wherein the interactive component assembly of each of the cam followers includes a linear motion transmitter guide to which the roller carrier is pivotally connected and on which the motion transmitter is slidably movable, a linear motion compensating wedge which is slidably located between a surface on the transmitter guide and a surface on the motion transmitter in a direction which is substantially normal to the direction of radial movement of the transmitter guide and means for moving the wedge between the two components to compensate for the non-linear conversion between the rotary motion of the rocker arrangement and the linear motion of the transmitter guide.

11. A CVT as claimed in claim 7 wherein the common output gear is fixed to the CVT output shaft.

12. A CVT as claimed in claim 7 wherein the CVT output shaft [112] is an extension of any one of the drive shafts, through its fixed output gear, the CVT input shaft extends through and projects from the smaller cross-sectional end of the rotor, the common gear which is meshed with the drive shaft output gears includes an axial bore and the CVT includes an engine braking system including a caged planetary gear system which is acted on by the input shaft extension, the common gear and a braking device which is located on a shaft which passes rotationally through the common gear bore to the planetary gear system and which is adapted controllably to brake the planetary system cage to cause power to be transmitted in a forward direction through the CVT from the CVT output shaft to its input shaft while creating a circulating power loop from the rotor, through the cam followers and back to the output gears of the drive shafts.

13. A CVT as claimed in claim 9 including an engine braking system wherein the cam follower rocker arrangement includes a sleeve which carries the pivot head and which is freely rotatable on the drive shaft with the sprag clutch being connected to act between one end of the sleeve and the drive shaft, a first clutch plate on the second end of the sleeve which is releasably engageable with the first and which is fixed to a first end of a tube shaft which is freely rotatable on the drive shaft and carries on its second end a fixed bevel gear of a gear arrangement which is adapted to reverse the direction of rotation of the second clutch plate relatively to the direction of rotation of the drive shaft and control means which, during engine braking, is timed from the rotating rotor to cause the second clutch plate to engage the first only in the drop direction of the cam follower stroke to transmit power from the CVT output shaft to the rotor.

14. A CVT as claimed in claim 13 wherein the rotor tapers from a large cross-sectional area at one end to a smaller cross-sectional area at its other end with its uniform cross-sectional peripheral profile including sections of cam drop that linearly, decreases at a constant rate with the corresponding change in rotor angle to coincide with the peripheral section in which the respective extraction devices are engaged in a specific cam follower roller path around the rotor with the constant rate decreasing linearly from the large to the smaller cross-sectional area of the rotor.

15. A CVT as claimed in claim 5 including a housing having two opposite and parallel side walls with the rotor located in and passing through the walls, two cam followers with their rollers bearing on opposite sides of the rotor with each cam follower carrying a freely rotatable toothed roller, a planetary gear assembly which includes two bevel gears which are freely rotatable on the machine output shaft and are fixed to rollers which are each circumferentially partially tooted, pinion gears which are rotatably meshed with the bevel gears and are attached to the assembly cage, sprag clutches which are engaged with each of the bevel gear rollers and the machine output shaft, two non-elastic flexible members which are each fixed at one end to and are engaged with and pass in opposite directions over the bevel gear rollers, pass over and are engaged with the cam follower rollers with their free second ends fixed to fixed structure in the housing so that on reciprocation of the cam followers on the rotor the bevel gears will be caused to oscillate in opposite directions of rotation on the output shaft [148] and so cause the sprag clutches sequentially to engage the output shaft during the 180° constant lift rate periods of the reciprocating cam followers on the rotor.

16. A CVT as claimed in claim 15 wherein the rollers are chain sprockets and the flexible members are chains.

17. A CVT as claimed in claim 15 wherein each of the cam followers is supported on a swinging arm arrangement which is pivotally connected to fixed structure in the housing.

18. A CVT as claimed in claim 15 wherein the planetary gear arrangement cage is a holed sprocket with the pinion gears being rotatable on shafts engaged with the sprocket and the CVT includes a tensioning sprocket which is engaged with the cage sprocket and is biased against rotation in both directions of rotation to maintain tension on the chains as the sprag clutches are engaged with the output shaft.

19. A CVT as claimed in claim 5 including a housing having two opposite and parallel side walls with the rotor located between the walls, at least two crank-shaped angular velocity profile generators which are equally spaced about the rotor with each of the profile generators including two spaced and parallel crank arms, a bridge member which connects common ends of the arms, pivot trunnions which are located on and project outwardly from the arms, on a common axis, intermediate the ends of the arms and which are journaled for rotation in the opposite housing walls, an angular velocity extraction device which is located on a trunnion on each of the profile generators adjacent a common housing wall, a drive wheel which is engaged with each of the extraction devices, an endless flexible drive element which is engaged with each of the drive wheels with the CVT output shaft fixed to either of the drive wheels, with the cam followers extending between and pivotally connected to the crank arms towards their free ends with their rollers in line contact with the rotor surface.

20. A CVT as claimed in claim 19 wherein the cam followers each include a roller swivel having oppositely projecting shafts which lie on a common axis and are pivotally engaged with the crank arms, roller axles which project outwardly from the swivel on a common axis which is normal to the swivel shaft axis and on which each of the rollers is rotatably located and the roller contact biasing means is a spring which acts between the roller swivel and fixed housing structure to bias the cam follower towards the rotor.

21. A CVT as claimed in claim 19 wherein the arms of the angular velocity profile generator crank arms are made from flat plate which lie in planes which are normal to the rotor axis of rotation and the linear conversion interacting components of each of the cam followers are arcuate slots in each of the crank arms, an arcuate drive segment which is rotatably located on each of the roller swivel shafts and which is slidably located in a curved arm slot, a parallel sided guide element which is rotatably located on each of the swivel shafts on the outside of the arcuate drive segment and which is slidably engaged in a parallel sided slot the direction of elongation of which is normal to the direction of the rotor axis.

* * * * *